(12) United States Patent
Coreil et al.

(10) Patent No.: US 12,121,410 B2
(45) Date of Patent: Oct. 22, 2024

(54) BONE-MOUNTED DENTAL ARCH VENEERS AND METHODS FOR FABRICATING AND UTILIZING THE SAME

(71) Applicant: Trion Concepts, Inc., El Paso, TX (US)

(72) Inventors: Mark Coreil, Lafayette, LA (US); Christopher C. Cosse, Shreveport, LA (US)

(73) Assignee: Trion Concepts, Inc., El Paso, TX (US)

( * ) Notice: Subject to any disclaimer, the term of this patent is extended or adjusted under 35 U.S.C. 154(b) by 0 days.

(21) Appl. No.: 18/487,464

(22) Filed: Oct. 16, 2023

(65) Prior Publication Data

US 2024/0041577 A1    Feb. 8, 2024

Related U.S. Application Data

(62) Division of application No. 16/739,387, filed on Jan. 10, 2020, now Pat. No. 11,786,346.
(Continued)

(51) Int. Cl.
*A61C 13/107* (2006.01)
*A61C 5/20* (2017.01)
(Continued)

(52) U.S. Cl.
CPC .............. *A61C 13/26* (2013.01); *A61C 5/20* (2017.02); *A61C 7/00* (2013.01); *A61C 8/0096* (2013.01);
(Continued)

(58) Field of Classification Search
CPC ......... A61C 5/20; A61C 5/007; A61C 8/0048; A61C 8/0095; A61C 8/0096;
(Continued)

(56) References Cited

U.S. PATENT DOCUMENTS 1,586,912 A      6/1926  Murphy
2,411,001 A  *  11/1946  Rothkranz ............. A61C 13/26
                                              433/182
(Continued)

FOREIGN PATENT DOCUMENTS

JP          5921947 B2     5/2016
WO    WO2008/042936 A2    4/2008
(Continued)

OTHER PUBLICATIONS

English-language machine translation of Japanese Patent No. JP 5921947 B2, Google Patents, May 24, 2016.
(Continued)

*Primary Examiner* — Edward Moran
(74) *Attorney, Agent, or Firm* — Kolitch Romano Dascenzo Gates LLC

(57) ABSTRACT

Bone-secured dental arch veneers and methods for fabricating and utilizing the same. The dental arch veneers include a veneer assembly having one or more tooth veneers and a support structure configured to support the tooth veneer(s). The dental arch veneers also include a coupling structure configured to interconnect the veneer assembly to a bone mount that is anchored along a user's maxilla or mandible. The coupling structure also is configured to permit the veneer assembly to be selectively and repeatedly interconnected with and disconnected from the bone mount. The methods include determining a target region within the user's mouth, obtaining a representation of the target region, manipulating the representation to create a desired arrangement of the user's teeth within the target region, determining anchoring positions proximate the target region for anchoring the bone mount, and forming the dental arch veneer based on the anchoring positions and the desired arrangement.

20 Claims, 14 Drawing Sheets

Related U.S. Application Data

(60) Provisional application No. 62/791,247, filed on Jan. 11, 2019.

(51) Int. Cl.
*A61C 7/00* (2006.01)
*A61C 8/00* (2006.01)
*A61C 13/225* (2006.01)
*A61C 13/235* (2006.01)
*A61C 13/265* (2006.01)
*A61C 13/271* (2006.01)

(52) U.S. Cl.
CPC ...... *A61C 13/0001* (2013.01); *A61C 13/2255* (2013.01); *A61C 13/235* (2013.01); *A61C 13/2656* (2013.01)

(58) Field of Classification Search
CPC ... A61C 13/001; A61C 13/26; A61C 13/2656; A61C 13/0024; A61C 13/225; A61C 13/34; A61C 7/08; A61C 7/10
See application file for complete search history.

(56) References Cited

U.S. PATENT DOCUMENTS

| | | | |
|---|---|---|---|
| 2,714,764 | A | 8/1955 | Mandelbaum |
| 3,644,996 | A | 2/1972 | Weinkle |
| 4,204,324 | A | 5/1980 | Köstner et al. |
| 4,527,975 | A | 7/1985 | Ghafari et al. |
| 4,547,158 | A | 10/1985 | Roberts |
| 4,571,185 | A | 2/1986 | Rota |
| 4,741,698 | A * | 5/1988 | Andrews .............. A61C 8/0075 433/173 |
| 4,799,884 | A | 1/1989 | Bergersen |
| 5,194,001 | A * | 3/1993 | Salvo ....................... A61C 5/30 433/180 |
| 5,203,695 | A | 4/1993 | Bergersen |
| 5,306,150 | A | 4/1994 | Gittleman |
| 5,324,198 | A | 6/1994 | Hazen |
| 5,451,498 | A | 9/1995 | Hazen |
| 5,575,649 | A | 11/1996 | Lee |
| 5,697,779 | A | 12/1997 | Sachdeva et al. |
| 5,938,437 | A | 8/1999 | DeVincenzo |
| 6,450,807 | B1 | 9/2002 | Chishti et al. |
| 6,994,545 | B2 | 2/2006 | Mrotzek et al. |
| 7,357,637 | B2 | 4/2008 | Liechtung |
| 7,442,040 | B2 | 10/2008 | Kuo |
| 7,500,851 | B2 | 3/2009 | Williams |
| 7,520,747 | B2 | 4/2009 | Stonisch |
| 7,771,640 | B2 | 8/2010 | Cosse |
| 7,874,836 | B2 | 1/2011 | McSurdy, Jr. |
| 8,377,500 | B2 | 2/2013 | Yarovesky |
| 8,444,412 | B2 | 5/2013 | Baughman et al. |
| 8,926,327 | B2 | 1/2015 | Massad |
| 8,936,463 | B2 | 1/2015 | Mason et al. |
| 9,408,675 | B2 | 8/2016 | Knopp et al. |
| D770,623 | S | 11/2016 | Robichaud |
| 9,610,145 | B2 | 4/2017 | Howe |
| 9,820,828 | B1 | 11/2017 | Mustafa |
| 10,265,141 | B2 | 4/2019 | Mason et al. |
| 11,786,346 | B2 * | 10/2023 | Coreil ....................... A61C 5/20 433/177 |
| 11,833,008 | B1 | 12/2023 | Motlagh |
| 2004/0009449 | A1 | 1/2004 | Mah et al. |
| 2004/0048223 | A1 | 3/2004 | Phan et al. |
| 2004/0081938 | A1 | 4/2004 | Chishti et al. |
| 2004/0152046 | A1 | 8/2004 | Minoretti et al. |
| 2004/0248065 | A1 | 12/2004 | Schneider |
| 2005/0186524 | A1 | 8/2005 | Abolfathi et al. |
| 2005/0227204 | A1 | 10/2005 | Hauck |
| 2006/0188834 | A1 | 8/2006 | Hilliard |
| 2007/0117067 | A1 | 5/2007 | Rock et al. |
| 2008/0044793 | A1 | 2/2008 | White |
| 2008/0090196 | A1 | 4/2008 | Lomas |
| 2008/0176189 | A1 | 7/2008 | Stonisch |
| 2008/0299510 | A1 | 12/2008 | Penchas et al. |
| 2009/0075235 | A1 | 3/2009 | Letcher |
| 2009/0142734 | A1 | 6/2009 | Albert |
| 2009/0208897 | A1 | 8/2009 | Kuo |
| 2010/0297585 | A1 | 11/2010 | Yarovesky |
| 2011/0033815 | A1 | 2/2011 | Stonisch |
| 2011/0081630 | A1 | 4/2011 | Beveridge |
| 2011/0207084 | A1 | 8/2011 | Kaigler, Sr. |
| 2015/0216631 | A1 | 8/2015 | Park |
| 2017/0007367 | A1 | 1/2017 | Li et al. |
| 2017/0014206 | A1 | 1/2017 | Lampl |
| 2017/0196657 | A1 | 7/2017 | Nixon et al. |
| 2018/0042705 | A1 | 2/2018 | Howe |
| 2018/0071054 | A1 | 3/2018 | Ha |
| 2018/0243051 | A1 | 8/2018 | Stemmer et al. |
| 2019/0046298 | A1 | 2/2019 | Cinader, Jr. |
| 2020/0222158 | A1 | 7/2020 | Coreil |
| 2021/0153988 | A1 | 5/2021 | Abdulrazzaq |
| 2021/0322134 | A1 | 10/2021 | Hamed et al. |
| 2022/0142753 | A1 * | 5/2022 | Tuckman ............... A61C 13/08 |
| 2022/0361984 | A1 * | 11/2022 | Philip ..................... A61C 5/30 |

FOREIGN PATENT DOCUMENTS

| | | |
|---|---|---|
| WO | WO 2011/145863 A2 | 11/2011 |
| WO | WO 2014/106676 A1 | 7/2014 |
| WO | WO 2017/006179 A1 | 1/2017 |
| WO | WO2017186835 A1 | 11/2017 |

OTHER PUBLICATIONS

Horliana, et al., "Dental Extrusion with Orthodontic Miniscrew Anchorage: A Case Report Describing a Modified Method," Case Reports in Dentistry, Hindawi Publishing Corp., vol. 2015, Article ID 909314, 6 pages, Jan. 12, 2015, available from: http://dx.doi.org/10.1155/2015/909314.

Marcantonio, et al., "Use of Alveolar Distraction Osteogenesis for Anterior Maxillary Defect Reconstruction," J of Indian Soc of Periodontol [serial online] 23:381-6, 2019, available from: http://www.jisponline.com/text.asp?2019/23/4/381/254119.

English language abstract of PCT Patent Application Publication No. WO 2011/145863 A2, European Patent Office, Nov. 24, 2011.

English language abstract of PCT Patent Application Publication No. WO 2014/106676 A1, European Patent Office, Jul. 10, 2014.

Javaid, Mohd et al., Current Status and Applications of Additive Manufacturing in Dentistry: A Literature-based Review, Journal of Oral Biology and Craniofacial Research, 9 (2019), pp. 179-185.

Nelson, Craig, Customized Characterization Made Easy, Inside Dental Technology, Jul. 2014, vol. 5, Issue 7, available from: https://www.aegisdentalnetwork.com/idt/2014/07/Customized-Characterization-Made-Easy.

Polar Seal, User Friendly Incision Films, accessed on Aug. 18, 2021 from: https://www.polarseal.net/applications/surgical-films/ on Aug. 18, 2021.

Wunderer, Julia et al., A Mechanism for Temporary Bioadhesion, PNAS, Mar. 5, 2019, vol. 116, No. 10, pp. 4297-4306.

Black Bear Concrete, Top 5 Reasons to Consider Urethane Flooring for Warehouse, Food Facilities, or Research Labs, 2016 (Year: 2016).

* cited by examiner

BONE-MOUNTED DENTAL ARCH VENEERS AND METHODS FOR FABRICATING AND UTILIZING THE SAME

RELATED APPLICATIONS

This application claims priority under 35 U.S.C. § 120 to U.S. patent application Ser. No. 16/739,387, which was filed on Jan. 10, 2020, which is entitled "BONE-MOUNTED DENTAL ARCH VENEERS AND METHODS FOR FABRICATING AND UTILIZING THE SAME," and which claims priority under 35 U.S.C. § 119(e) to U.S. Provisional Patent Application No. 62/791,247, which was filed on Jan. 11, 2019, and which is entitled "DENTAL ARCH VENEER." The complete disclosures of the above-identified patent applications are hereby incorporated by reference.

FIELD

The present disclosure relates to dental veneers and methods for fabricating and utilizing the same.

BACKGROUND

According the American College of Prosthodontics, 120 million U.S. citizens have one or more missing teeth, such as due to nutritional changes, obesity, diabetes, coronary artery disease, and cancer. In addition to this, a study commissioned by the American Association of Orthodontists found that over one third of American adults are unhappy with the appearance of their teeth, and of this group, 36 percent believe they would have a better social life if they had better teeth.

Individuals who have missing, misaligned, and/or broken teeth may consider orthodontic treatment and/or surgical procedures to try to correct the appearance of missing, misaligned, and/or broken teeth. For example, orthodontic treatment may include movement and/or adjustment of the relative position of one or more of an individual's teeth. As another example, surgical treatment may include surgeries to improve the structure of the individual's jawbones and/or gums. Individuals who have missing, misaligned, and/or broken teeth also may consider dental prosthetics to mask (i.e., cover or obscure) the appearance of missing, misaligned, and/or broken teeth. Examples of conventional dental prosthetics include fake teeth that are surgically implanted into an individual's jawbone or coupled to the individual's existing teeth or gums. Additional examples of conventional dental prosthetics include tooth veneers that are secured directly to an individual's existing teeth.

A challenge with these existing solutions is that individuals having missing, misaligned, and/or broken teeth cannot readily undergo surgical and/or orthodontic treatment to correct the appearance of the missing, misaligned, and/or broken teeth while also utilizing conventional dental prosthetics to mask the appearance of the missing, misaligned, and/or broken teeth. For example, many orthodontic procedures require movement of the individual's existing teeth into an ideal position utilizing orthodontic braces or aligners that engage with and/or otherwise reposition the individual's existing teeth. This movement typically will change the relative position of the individual's existing teeth and thereby cause existing dental prosthetics to no longer be effective. As another example, many existing corrective surgeries result in a surgical site that needs time to heal. Thus, there exists a need for improved dental prosthetics that mask the appearance of an individual's missing, misaligned, and/or broken teeth without directly contacting the individual's existing teeth or otherwise interfering with the individual's orthodontic or surgical treatment to correct the appearance of the individual's missing, misaligned, and/or broken teeth.

SUMMARY

Bone-secured dental arch veneers and methods for fabricating and utilizing the same are disclosed herein. The dental arch veneers are configured to be temporarily installed in a user's mouth and provide a desired oral appearance to the user's mouth. The dental arch veneers include a veneer assembly that includes one or more tooth veneers and a support structure that is operatively coupled to the one or more tooth veneers and configured to support the one or more tooth veneers. The dental arch veneers also include a coupling structure that is configured to interconnect the veneer assembly to a bone mount that is installed in a mandible or a maxilla of the user's mouth and includes one or more bone screws that are anchored in one or more bone surfaces of the maxilla or the mandible. The coupling structure also is configured to permit the veneer assembly to be selectively and repeatedly interconnected with and disconnected from the bone mount without damaging the dental arch veneer.

The methods include determining a target region within the user's mouth that is to be obscured by the veneer assembly, obtaining a representation of at least one of the user's teeth and the user's gum within the target region, manipulating the representation to create a desired arrangement of the user's teeth and gum within the target region, determining a plurality of anchoring positions within a bone structure proximate the target region for anchoring a plurality of bone screws of the bone mount, and forming the dental arch veneer based on the anchoring positions and the desired arrangement.

DETAILED DESCRIPTION

FIGS. 1-14 provide examples of dental arch veneers according to the present disclosure, of components of dental arch veneers according to the present disclosure, and/or of methods for fabricating and utilizing dental arch veneers according to the present disclosure. Elements that serve a similar, or at least substantially similar, purpose are labelled with like numbers in each of FIGS. 1-14, and these elements may not be discussed in detail herein with reference to each of FIGS. 1-14, but reference numbers associated therewith may be utilized herein for consistency. Elements, components, and/or features that are discussed herein with reference to one or more of FIGS. 1-14 may be included in and/or utilized with any of FIGS. 1-14, without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure. Dashed lines also may be used to indicate alternative positioning of elements within a given embodiment.

Figure 1:
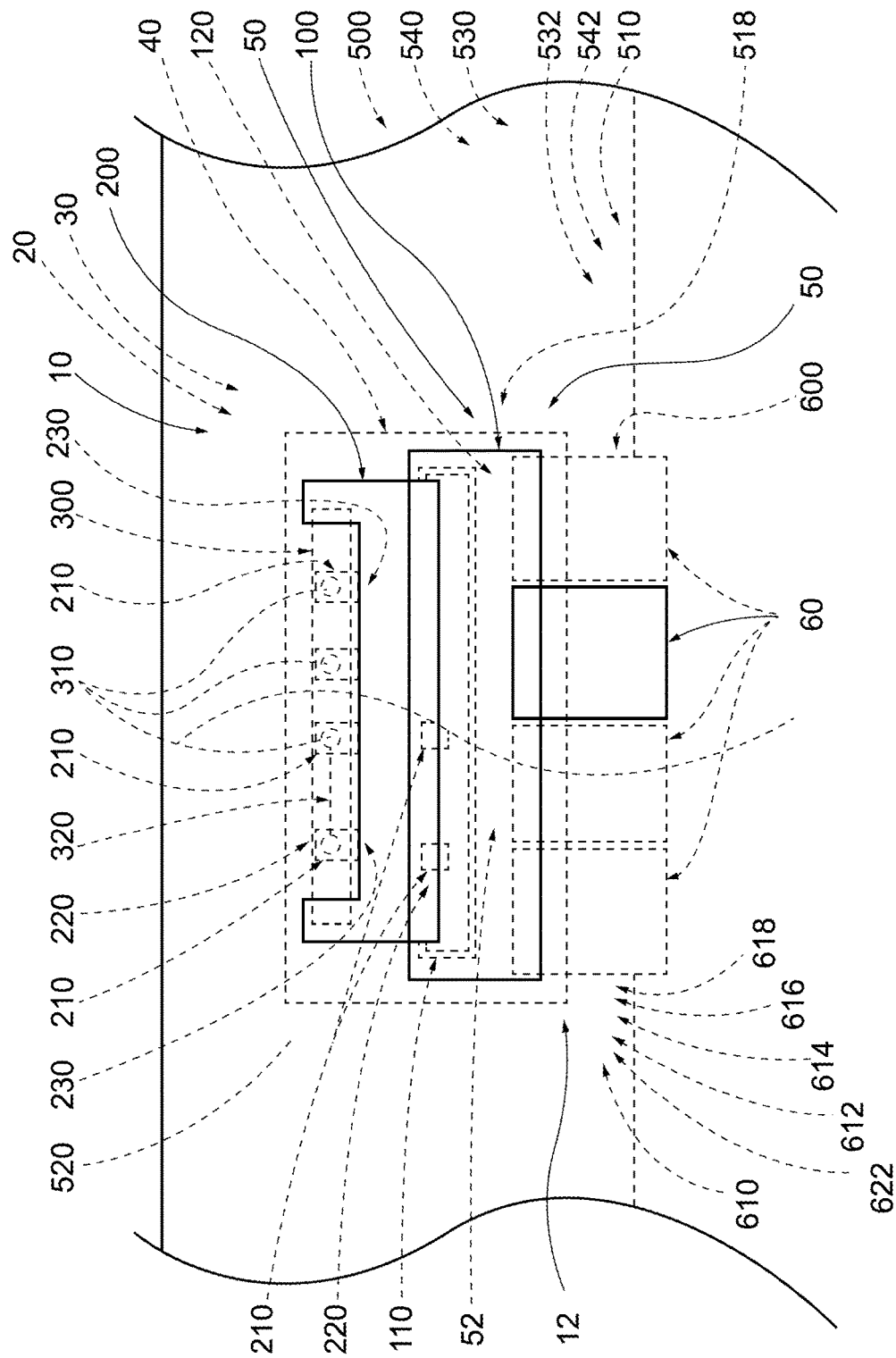
FIG. 1 is a schematic illustration of examples of dental arch veneers, according to the present disclosure.

FIG. 1 schematically illustrates examples of dental arch veneers 10, according to the present disclosure. Dental arch veneer 10 is configured to be temporarily installed in a user's mouth 500 to provide a desired oral appearance 12 to user's mouth 500. Thus, in some examples, dental arch veneer 10 may be described as a cosmetic dental appliance. Desired oral appearance 12 may include a desired arrangement, position, and/or other appearance of one or more of the user's teeth and/or gum. Desired oral appearance 12 may be based on a manipulated representation of the user's mouth.

Dental arch veneer 10 includes a veneer assembly 50 that includes one or more tooth veneers 60 and a support structure 100 that is operatively coupled to, and configured to support, the one or more tooth veneers 60. Dental arch veneer 10 also includes a coupling structure 200 that is configured to interconnect veneer assembly 50 to a bone mount 300 that is installed in a maxilla 530 or a mandible 540 of the user's mouth 500. More specifically, bone mount 300 may include one or more bone screws 310 that are anchored in one or more bone surfaces 520 of maxilla 530 or mandible 540. Coupling structure 200 also is configured to support veneer assembly 50 spaced apart from a corresponding dental arch 510 of the user's mouth and to permit veneer assembly 50 to be selectively and repeatedly interconnected with and disconnected from bone mount 300 without damaging dental arch veneer 10, bone mount 300, and/or the user's mouth. Thus, dental arch veneer 10 may be described as being bone-secured and/or as being a bone-secured dental arch veneer 10.

As discussed herein, dental arch 510 may be described as an arrangement of teeth 610 disposed along the mandible 540 or maxilla 530 of the user's mouth. Thus, the user's mouth may include a maxillary dental arch 532 having upper arrangement of teeth and a mandibular dental arch 542 having a lower arrangement of teeth. When the present disclosure makes reference to a "corresponding" dental arch 510, the corresponding dental arch 510 refers to the dental arch 510 that is proximal to an installation position of bone mount 300. For example, as discussed herein, the corresponding dental arch 510 refers to a mandibular dental arch 542 when the bone mount 300 is installed in the user's mandible 540, and the corresponding dental arch 510 refers to a maxillary dental arch 532 when bone mount 300 is installed in the user's maxilla 530. Similarly, when dental arch veneer 10 is temporarily installed along mandible 540, dental arch veneer 10 may be referred to as a mandibular dental arch veneer 30, and when dental arch veneer 10 is temporarily installed along maxilla 530, dental arch veneer 10 may be referred to as maxillary dental arch veneer 20.

The arrangement of teeth 610 of dental arch 510 may include any or all teeth disposed along the mandible or maxilla of the user's mouth. As examples, the arrangement of teeth may include incisor teeth, canine teeth, premolar teeth, and/or molar teeth. Arrangement of teeth 610 additionally or alternatively may include the user's natural teeth, such as damaged teeth and/or misaligned teeth. In some examples, arrangement of teeth 610 includes one or more non-natural fixtures, such as dental prostheses and/or dental implants, that may be installed in the user's mouth in place of the user's natural teeth. Additionally or alternatively, the arrangement of teeth 610 may include one or more gaps or empty spaces that correspond to one or more missing teeth and/or one or more surgical sites, which also may include one or more gaps or empty spaces.

With continued reference to FIG. 1, bone mount 300 may be installed in any suitable region of the user's mouth and may include any suitable number of bone screws 310 for anchoring bone mount 300 to a user's oral bone structure. As examples, bone mount 300 may include at least 1 bone screw, a least 2 bone screws, at least 4 bone screws, at least 6 bone screws, at least 8 bone screws, at most 10 bone screws, and/or at most 12 bone screws.

Depending on such factors as a desired stability and/or desired placement of dental arch veneer 10 within the user's mouth, the condition of the user's corresponding dental arch, and the number of teeth represented in desired oral appearance 12, each bone screw 310 may be installed in a different region of the user's mouth. For example, bone mount 300 may include one or more buccal bone screws that are mounted along one or more buccal bone surfaces of the user's maxilla or mandible. As another example, when dental arch veneer 10 is configured to be installed along the user's maxilla, and/or is the maxillary dental arch veneer 20, bone mount 300 may include one or more palatal bone screws that are anchored in a palatal bone surface of the user's maxilla. As yet another example, when dental arch veneer 10 is configured to be installed along the user's mandible, and/or is the mandibular dental arch veneer 30, bone mount 300 may include one or more lingual bone screws that are anchored in a lingual bone surface of the user's mandible.

As discussed herein, bone screws 310 may include any suitable anchoring devices that are configured to be fixedly secured to a user's oral bone structure. Thus, bone screws 310 additionally or alternatively may, may include, and/or may be referred to as bone anchors, surgical anchors, and/or bone fasteners. As examples, bone screws 310 may be and/or may include pins, rods, threaded screws, and/or interference fits. In some examples, coupling structure 200 of dental arch veneer 10 is configured to interconnect with, or couple to, one or more bone screws 310 of bone mount 300. Additionally or alternatively, bone mount 300 may include a rail 320 that is operatively coupled to, and extends between, two or more bone screws 310, and coupling structure 200 may be configured to interconnect with, or couple to, rail 320. Examples of bone mounts and bone screws, as well as methods for installing bone mounts and bone screws that may be utilized in conjunction with the dental arch veneers of the present disclosure, are disclosed in detail in U.S. Pat. No. 5,697,779, the entirety of which is hereby incorporated by reference.

With continued reference to FIG. 1, dental arch veneer 10 may be configured to obscure a target region 600 of the user's mouth and present desired oral appearance 12 in a vestibular direction of target region 600. As discussed herein, the vestibular direction is a direction extending from corresponding dental arch 510 towards a vestibule of the user's mouth and/or extending opposite to a lingual surface of the dental arch. Stated another way, the vestibular direction is directed outwardly from both buccal and labial surfaces of the dental arch.

Target region 600 includes any suitable region or area of the user's mouth for which improved oral appearance is desired. In some examples, target region 600 may include a region of the dental arch corresponding to a single tooth, or target region 600 may include a region of the dental arch corresponding to a plurality of teeth. In some examples, target region 600 includes a region corresponding to the entire corresponding dental arch, and in other examples, target region 600 includes a region corresponding to only a portion of the corresponding dental arch. As a more specific example, target region 600 may include only an anterior region and/or highly visible region of the corresponding dental arch. As yet a more specific example, the target region may include a region corresponding to a forward-most, or anterior-most, 6 teeth of the corresponding dental arch. As schematically represented in FIG. 1, and less schematically illustrated in FIG. 2, target region 600 may include one or more of the user's teeth 610, such as one or more damaged teeth 612, one or more misaligned teeth 614, one or more gaps 616 corresponding to missing teeth, one or more non-natural fixtures 622, and/or one or more surgical sites 618. As discussed herein, non-natural fixtures 622 may include any artificial or installed element that is fixedly secured to the user's dental arch. As examples, non-natural fixtures may include dental implants, pre-implant sites, and/or artificial crowns.

In view of the above, dental arch veneer 10 may include any suitable number of tooth veneers 60, such as to obscure target region 600 and present the desired oral appearance in the vestibular direction of target region 600. As examples, dental arch veneer 10 may include at least 1 tooth veneer 60, at least 2 tooth veneers 60, at least 4 tooth veneers 60, at least 6 tooth veneers 60, at least 8 tooth veneers 60, at least 10 tooth veneers 60, at least 12 tooth veneers 60, at most 8 tooth veneers 60, at most 10 tooth veneers 60, and/or at most 16 tooth veneers 60. Tooth veneers 60 may be configured to, or formed to, present the desired oral appearance of the user's teeth within the target region. Stated another way, tooth veneers 60 may be formed in any suitable manner, formed from suitable one or more materials, and/or positioned with any suitable arrangement within veneer assembly 50, such that the desired oral appearance of the user's mouth is presented.

Tooth veneers 60 may be formed from any suitable material or combination of materials selected to provide a desired stability and appearance to the tooth veneers. As examples, tooth veneers 60 may be formed from materials such as one or more resins, one or more metals, one or more ceramics, one or more polymeric materials, and/or combinations thereof. Tooth veneers 60 also may be colored in any suitable manner such as to provide the desired oral appearance.

In some examples, tooth veneers 60 are formed to be thinner, or to possess a smaller vestibular cross-section relative to the user's teeth within the target region, such that veneer assembly 50 may be supported in a spaced-apart position relative to corresponding dental arch 510 in a vestibular direction by coupling structure 200 without visibly deforming the user's corresponding lip. Stated another way, in some examples, it is desirable for tooth veneers 60 to possess a thinner vestibular cross-section relative to the user's teeth within the target region, such that veneer assembly 50 protrudes to a lesser extent within the user's vestibule and presents a more natural appearance to the user's mouth.

In some examples, at least a subset of, or all of, tooth veneers 60 are discrete, or separately formed, and the tooth veneers may be supported in a desired arrangement 52 by support structure 100. Additionally or alternatively, at least a subset of, or all of, tooth veneers 60 define, or are formed from, a single body. In either example, any given tooth veneer 60 may be formed to, or arranged to, and/or configured to present a desired appearance of an underlying tooth, or gap thereof, in the user's corresponding dental arch. As a specific example, when target region 600 includes one or more misaligned teeth 614, dental arch veneer 10 may be configured such that one or more tooth veneers 60 that obscure, or are positioned spaced apart in a vestibular direction from, the one or more misaligned teeth are configured to present an aligned or improved appearance of the one or more misaligned teeth 614. In any of the above examples, tooth veneers 60 and/or veneer assembly 50 may be formed as a series of discrete bodies that may be operatively joined together by support structure 100 and/or may be formed as a single body with support structure 100.

Figure 2:
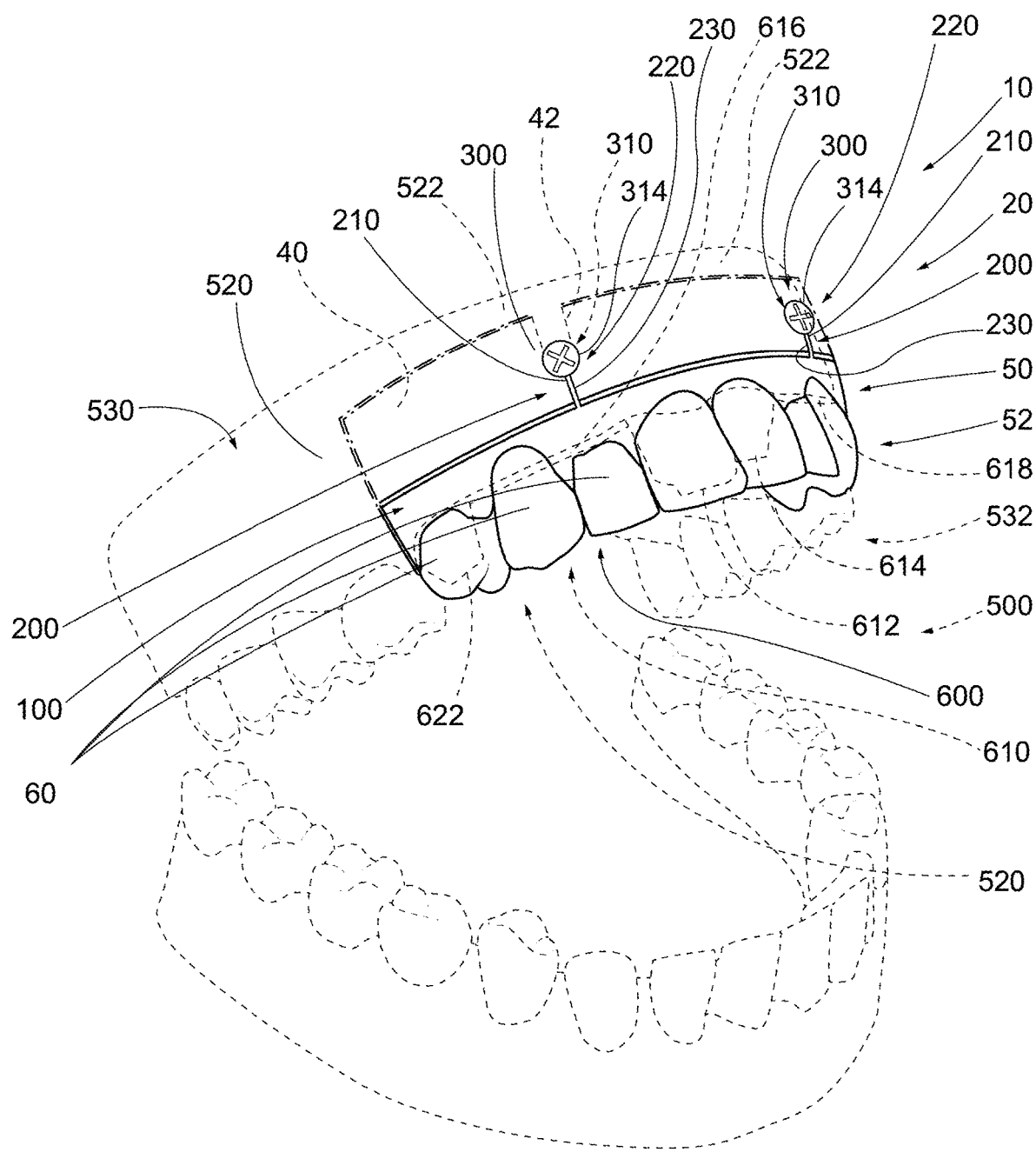
FIG. 2 is a less schematic illustration of examples of dental arch veneers temporarily installed in a user's mouth, according to the present disclosure.

As schematically represented in FIG. 1 and less schematically represented in FIG. 2, support structure 100 may be configured to support tooth veneers 60 in a desired arrangement 52. In some examples, desired arrangement 52 of tooth veneers 60 is based on the desired oral appearance of the user's corresponding dental arch 510, or portion thereof, within target region 600. As a more specific example, and as illustrated in FIG. 2, support structure 100 may be configured to support tooth veneers 60 in an arcuate arrangement that corresponds to a shape of the corresponding dental arch 510 within target region 600. Support structure 100 also may extend along and/or define any suitable region of dental arch veneer 10 and/or may interconnect with any suitable portion of coupling structure 200. Likewise, support structure 100 may be configured to extend within, or along, any suitable one or more regions of the user's mouth when dental arch veneer 10 is installed in the user's mouth.

With continued reference to FIG. 1, tooth veneers 60 may extend from support structure 100 in a desired arrangement that presents the desired oral appearance 12 of the user's teeth. In some examples, support structure 100 defines a continuous structure to which tooth veneers 60 are mounted. Additionally or alternatively, support structure 100 may extend between, and/or couple to, adjacent tooth veneers 60, such as to join individual tooth veneers 60 into a continuous structure.

Support structure 100 may include any suitable structure, or combination of substructures, for supporting tooth veneers 60. As examples, support structure 100 may be integral with, and/or integrally formed with, one or more of tooth veneers 60. Additionally or alternatively, support structure 100 may be integral with, or integrally formed with, coupling structure 200. As more examples, support structure 100 may be fixedly coupled to one or more of tooth veneers 60, such as by an adhesive, weld, or other suitable agent or structure. Support structure 100 also may be fixedly coupled to coupling structure 200, such as by an adhesive, weld, or other suitable agent or structure. However, as discussed in more detail herein, in some examples, coupling structure 200 is configured to be selectively and repeatedly coupled to, and uncoupled from, support structure 100.

Support structure 100 may be formed from any suitable one or more materials. As examples, support structure 100 may be formed from the same material(s) as tooth veneers, and/or may be formed from one or more different materials from tooth veneers. As more specific examples, support structure 100 may be formed from one or more resins, one or more metals, one or more ceramics, one or more polymeric materials, and/or combinations thereof.

As illustrated in FIG. 1, in some examples, support structure 100 includes a support bar 110 that may be configured to reinforce dental arch veneer 10. In some examples, support bar 110 is configured to be operatively coupled to, and/or interconnected with, coupling structure 200 through a coupling mechanism 220. With this in mind, in some examples, support bar 110 includes a non-circular cross-section to reduce a potential for rolling of veneer assembly 50 across a selectively coupled interface with coupling structure 200. In some examples, tooth veneers 60 are fixedly coupled to support bar 110. As further illustrated in FIG. 1 and discussed in more detail herein with reference to FIGS. 11-13, support structure 100 may include an adjustment mechanism 120 that is configured to permit selective adjustment of an arch-span of dental arch veneer 10, which may permit dental arch veneer 10 to be temporarily installed in the user's mouth while the user's mouth is undergoing orthodontic expansion and/or contraction procedures.

As schematically shown in FIG. 1, in some examples, target region 600 includes a region of the user's gum 518. With this in mind, and as illustrated in FIG. 1, dental arch veneer 10 may include an artificial gum structure 40 that is configured to present a desired oral appearance of the user's gum, for example, within target region 600. More specifically, artificial gum structure 40 may be configured to present a desired gum appearance to the user's mouth in a vestibular direction of target region 600.

In some examples, artificial gum structure 40 defines at least a portion of support structure 100. Stated another way, in some examples, artificial gum structure 40 is configured to support one or more tooth veneers 60. In some examples, artificial gum structure 40 defines at least a portion of coupling structure 200. When artificial gum structure 40 defines at least a portion of coupling structure 200, artificial gum structure 40 may be configured to selectively and repeatedly interconnect with, and disconnect from, bone mount 300. Additionally or alternatively, artificial gum structure 40 may be configured to at least partially cover a vestibular surface of support structure 100 and/or tooth veneers 60. Likewise, in some examples, artificial gum structure 40 may be configured to at least partially cover a vestibular surface of coupling structure 200 and/or veneer assembly 50. In such examples, artificial gum structure 40 may be fixedly coupled to and/or adhered to support structure 100, tooth veneers 60, and/or coupling structure 200, such as by an adhesive, weld, or other suitable agent or structure. Stated more generally, in some examples, artificial gum structure 40 may define one or more structural portions of dental arch veneer 10, and/or in some examples, artificial gum structure 40 may be configured to obscure or cover one or more structural portions of dental arch veneer 10.

Artificial gum structure 40 may be colored to resemble the user's natural gum, or may be colored to present a desired appearance of the user's gum. In some examples, artificial gum structure 40 may be formed from a resilient material, such as to present a gum-like appearance in a vestibular direction of the user's gum. Additionally or alternatively, artificial gum structure 40 may be formed from one or more of the same materials as, and/or one or more different materials, that form veneer assembly 50 and/or coupling structure 200.

As discussed herein, dental arch veneer 10 includes a coupling structure 200 that is configured to interconnect veneer assembly 50 to bone mount 300 and permit veneer assembly 50 to be selectively and repeatedly interconnected with and disconnected from bone mount 300 without damaging dental arch veneer 10. As discussed herein, "without damaging dental arch veneer 10" may refer to without damaging the entire dental arch veneer 10 and/or portions thereof. Stated differently, "without damaging the dental arch veneer 10" may refer to without damaging any portion or component of dental arch veneer 10 that is configured to be repeatedly utilized within dental arch veneer 10. More specifically, in some examples, dental arch veneer 10 and/or bone mount 300 may include one or more disposable components or portions that may be configured to be replenished when dental arch veneer 10, and/or portions of bone mount 300, are temporarily removed from the user's mouth. As an example, coupling structure 200, and/or portions thereof, may be disposable, or may be configured to be replenished when dental arch veneer 10 is temporarily removed from the user's mouth. Likewise, portions of bone mount 300 may be disposable, or may be configured to be replenished when dental arch veneer 10 is temporarily removed from the user's mouth. Thus, in view of the above, coupling structure 200 may be configured to permit veneer assembly 50 to be repeatedly interconnected with, and disconnected from, bone mount 300 without damaging bone mount 300, veneer assembly 50, coupling structure 200, and/or portions thereof.

Coupling structure 200 may be configured to selectively interconnect veneer assembly 50 with bone mount 300 by any suitable mechanism. As illustrated in FIG. 1, bone mount 300 includes one or more bone screws 310. In some examples, coupling structure 200 is configured to be selectively and repeatedly coupled to, and uncoupled from, bone screws 310. Additionally or alternatively, in some examples, bone mount 300 includes rail 320 that extends between two or more bone screws 310, and coupling structure 200 may be configured to be repeatedly coupled to, and uncoupled from, rail 320. As more examples, coupling structure 200 may be configured to be selectively and repeatedly coupled to, and uncoupled from, veneer assembly 50. For example, coupling structure 200 may be configured to be selectively and repeatedly coupled to, and uncoupled from, support bar 110 of support structure. For some examples in which coupling structure 200 is configured to be selectively and repeatedly coupled to and uncoupled from veneer assembly 50, coupling structure 200, and/or or portions thereof, some or all of coupling structure 200 may remain within the user's mouth when veneer assembly 50 is removed from the user's mouth.

In view of the above, coupling structure 200 may extend from, define, and/or be operatively coupled to any suitable portion of dental arch veneer 10 and/or bone mount 300. As an example, coupling structure 200 may extend from bone mount 300, for example, when coupling structure 200 is configured to be selectively and repeatedly coupled to, and uncoupled from, veneer assembly 50. Alternatively, coupling structure 200 may extend from veneer assembly 50 and/or support structure 100, for example, when coupling structure 200 is configured to be selectively and repeatedly coupled to, and uncoupled from, bone mount 300. In some such examples, coupling structure 200 is integral with veneer assembly 50.

Coupling structure 200 may include any suitable structure, or set of structures, for interconnecting veneer assembly 50 with bone mount 300. As illustrated in FIG. 1, coupling structure 200 may include one or more couplers 210 that may be configured to be selectively and repeatedly coupled to, and uncoupled from, bone mount 300, bone screws 310, rail 320, veneer assembly 50, support structure 100, and/or support bar 110. With this in mind, couplers 210 may be included in, or define, any suitable portion of coupling structure 200. For example, when one or more couplers 210 are configured to be selectively and repeatedly coupled to, and uncoupled from, veneer assembly 50, the one or more couplers 210 may be disposed along an interface of veneer assembly 50 and coupling structure 200. As another example, when one or more couplers 210 are configured to be selectively and repeatedly coupled to, and uncoupled from, bone mount 300, the one or more couplers 210 may be positioned within coupling structure 200 in regions corresponding to installation positions of bone screws 310 and/or a position of rail 320.

In some examples, coupling structure 200 includes one or more bridging sections 230 that extend between veneer assembly 50 and one or more couplers 210. In some examples, each bridging section 230 is configured to position a coupler 210 in a region of the user's mouth where coupler 210 may be interconnected with bone mount 300. Stated another way, bridging sections 230 may be constructed based on the installation position of bone mount 300.

In some examples, couplers 210 are configured to be selectively and repeatedly coupled to, and uncoupled from, bone mount 300, bone screws 310, rail 320, veneer assembly 50, support structure 100, and/or support bar 110, through a coupling mechanism 220. In some examples, a coupler 210 may include a first portion of coupling mechanism 220, and bone mount 300, bone screws 310, rail 320, veneer assembly 50, support structure 100, or support bar 110 may include a second portion of coupling mechanism 220. In such examples, the first and second portions of coupling mechanism 220 may be configured to be selectively and repeatedly interconnected and disconnected. Examples of suitable coupling mechanisms 220 include one or more of a friction fit coupling mechanism, an adhesive coupling mechanism, a screw fit coupling mechanism, a magnetic coupling mechanism, a snap-fit coupling mechanism, and/or a press fit coupling mechanism. In some examples, each coupler 210 of coupling structure 200 includes the same coupling mechanism 220. In other examples, couplers 210 of coupling structure 200 include different coupling mechanisms 220, such as male/female couplers 210 that are configured to matingly interconnect.

Coupling structure 200 may be formed from any suitable one or more materials. As examples, coupling structure 200 may be formed from the same material(s) as veneer assembly 50, or may be formed from one or more different materials from veneer assembly 50. As more examples, coupling structure 200 may be formed from one or more resins, one or more metals, one or more ceramics, one or more polymeric materials, and/or combinations thereof.

FIG. 2 provides a somewhat less schematic representation of examples of dental arch veneer 10 temporarily installed in the user's mouth 500. In the examples of FIG. 2, dental arch veneer 10 is a maxillary dental arch veneer 20, and bone mount 300 includes bone screws 310 that are anchored in the bone surfaces 520 of the user's maxilla 530. More specifically, in the example shown, bone mount 300 includes buccal bone screws 314 that are mounted in buccal bone surfaces 522 of the user's maxilla 530. It is within the scope of the present disclosure that the examples of FIG. 2 also may be implemented as a mandibular dental arch veneer, with bone screws anchored in bone surfaces of the user's mandible.

As shown in FIG. 2, coupling structure 200 includes couplers 210 that are configured to be selectively and repeatedly coupled to and uncoupled from buccal bone screws 314. More specifically, couplers 210 may couple with buccal bone screws 314 through coupling mechanism 220, in which each coupler 210 may include a first portion of coupling mechanism 220, and each buccal bone screw 314 may include a second portion of coupling mechanism 220. Coupling structure 200 also includes bridging sections 230 that may extend between, or interconnect, veneer assembly 50 and couplers 210. Stated another way, in the example shown, coupling structure 200 extends from veneer assembly 50 to define couplers 210. Veneer assembly 50 includes a plurality of tooth veneers 60 that extend from support structure 100 in desired arrangement 52. In the example of FIG. 2, tooth veneers 60 are arranged in the arcuate arrangement that corresponds to the shape of the user's maxillary dental arch 532.

As illustrated in dot-dash lines in FIG. 2, dental arch veneer 10 further may include artificial gum structure 40. In some examples, artificial gum structure 40 covers at least a portion of a vestibular surface of support structure 100, and in some examples, artificial gum structure 40 defines at least a portion of support structure 100. When included, artificial gum structure 40 may extend above support structure 100 to cover at least a portion of a vestibular surface of coupling structure 200 and/or to define at least a portion of coupling structure 200. As shown, when artificial gum structure 40 extends above support structure 100 to cover and/or define at least a portion of coupling structure 200, artificial gum structure 40 may surround and/or cover at least portions, if not all, of bone mount 300 when dental arch veneer 10 is temporarily installed in the user's mouth. As a more specific example, artificial gum structure 40 may include one or more receiving portions 42, such as slots, that are configured to be fit over, and/or around, bone screws 310 of bone mount 300.

With continued reference to FIG. 2, coupling structure 200 interconnects veneer assembly 50 to bone screws 310 such that veneer assembly 50 may obscure a target region 600 that includes at least a region of the user's maxillary dental arch 532 and presents the desired oral appearance in a vestibular direction of target region 600. Target region 600 may include one or more of the user's teeth 610, such as one or more damaged teeth 612, one or more misaligned teeth 614, one or more gaps 616 corresponding to missing teeth, and/or one or more surgical sites 618. Additionally or alternatively, target region 600 includes one or more non-natural fixtures 622.

In any such example, coupling structure 200 may be configured to support veneer assembly 50 spaced apart in a vestibular direction from, and/or spaced forward of, target region 600, the user's teeth 610, and/or the user's maxillary dental arch 532. As discussed in more detail herein with reference to FIG. 6, in some examples, orthodontic hardware is installed in the user's mouth and the orthodontic hardware may extend within target region 600. In such examples, coupling structure 200 may be configured to support veneer assembly 50 spaced apart in a vestibular direction from the portion of orthodontic hardware that is positioned within target region 600. In such examples, veneer assembly 50 may be non-contacting with the orthodontic hardware. As a more specific example, the orthodontic hardware that is positioned within the target region may be installed on, or fixedly coupled to, vestibular surfaces of one or more of the user's teeth within target region 600, and veneer assembly 50 may be supported by coupling structure 200 such that the orthodontic hardware extends between veneer assembly 50 and the user's teeth 610.

Figure 8:
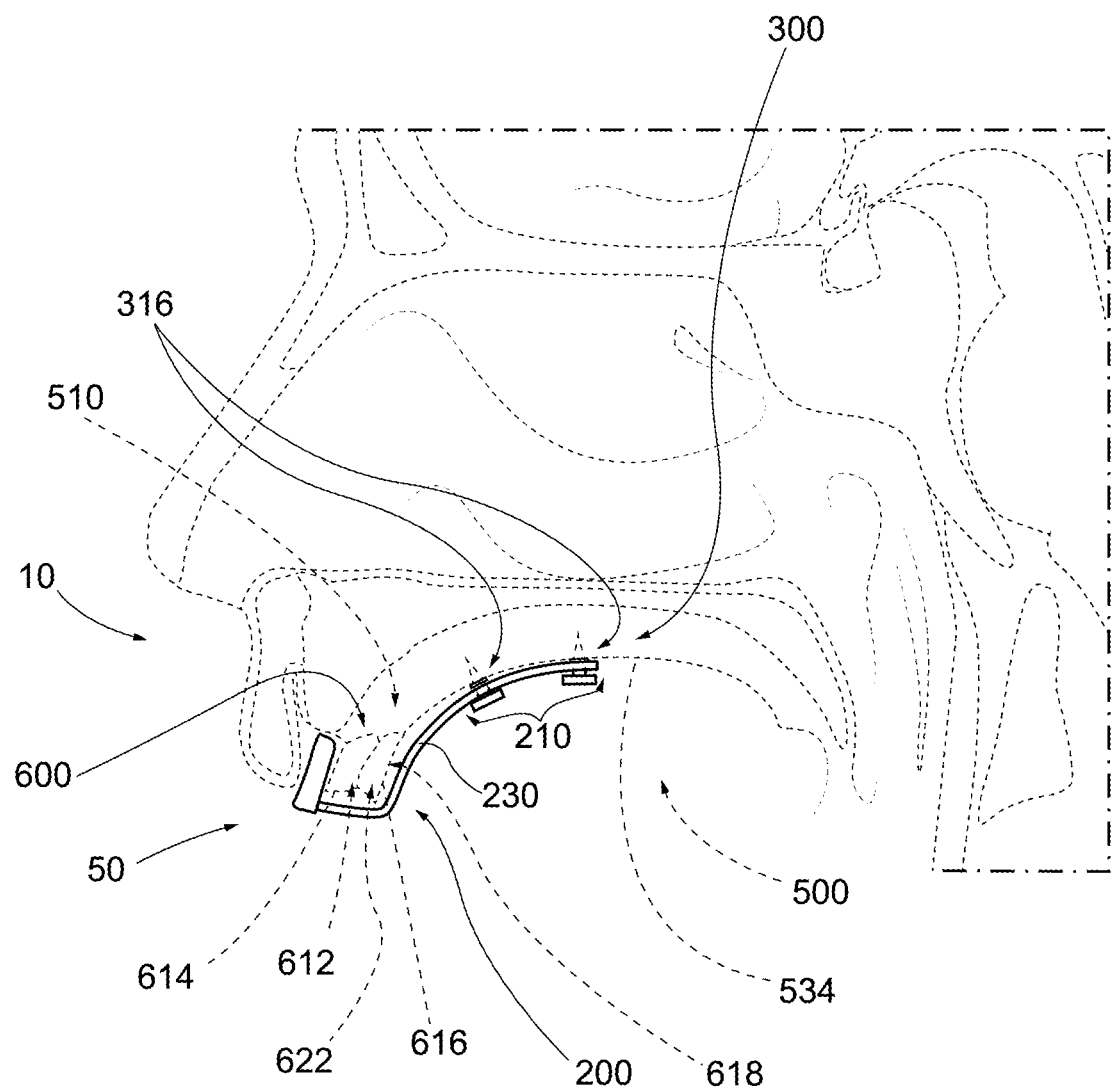
FIG. 8 is a side view illustrating examples of dental arch veneers temporarily installed in a user's mouth, according to the present disclosure.

Alternatively, as discussed in more detail herein with reference to FIG. 8, when target region 600 only includes gaps 616, and/or a surgical site 618, coupling structure 200 may be configured to support veneer assembly 50, such that veneer assembly 50 at least partially extends within target region 600.

Figure 3:
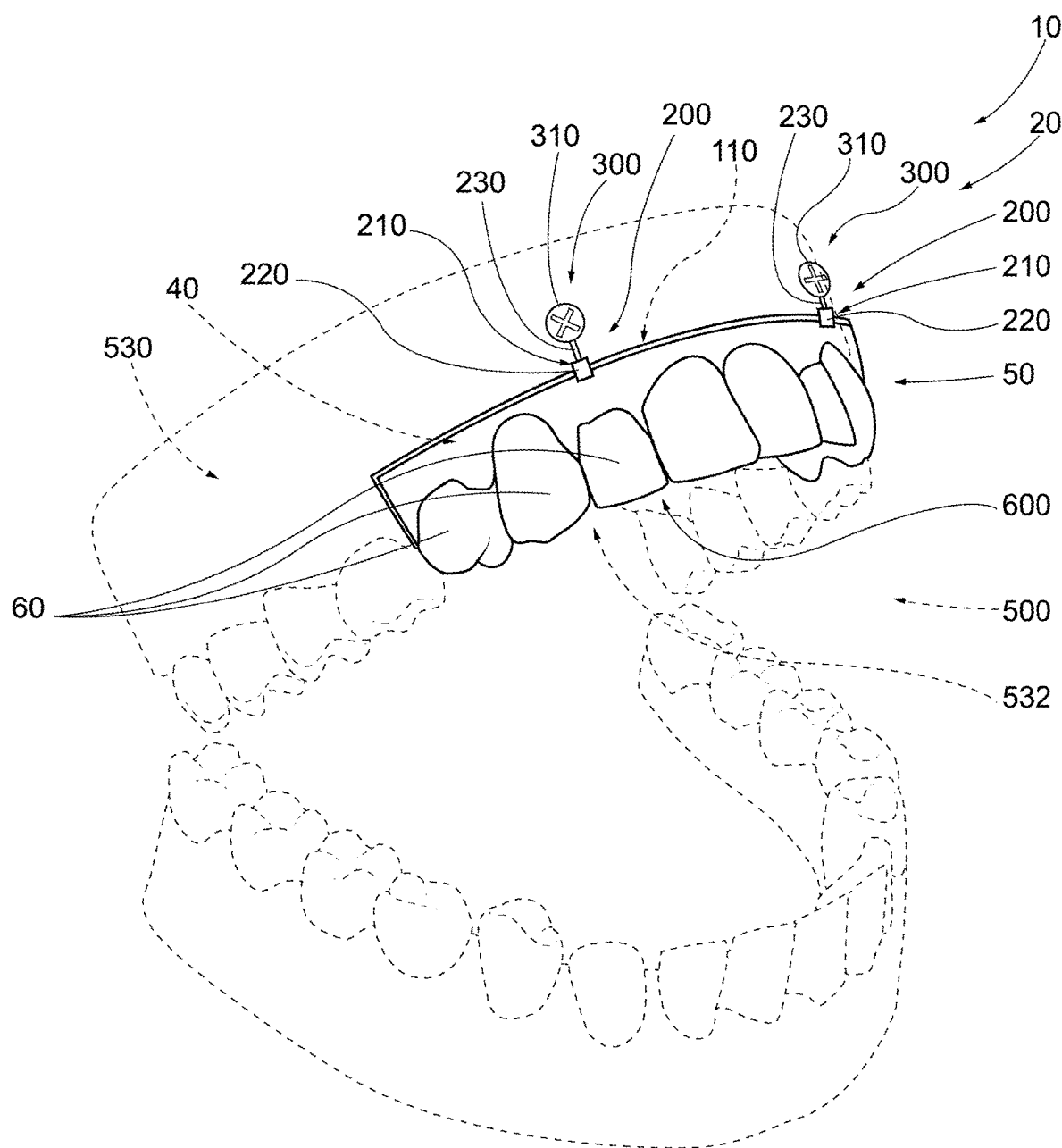
FIG. 3 is a less schematic illustration of examples of dental arch veneers temporarily installed in a user's mouth, according to the present disclosure.

FIG. 3 illustrates more examples of dental arch veneer 10 temporarily installed in the user's mouth 500. More specifically, FIG. 3 illustrates examples of dental arch veneer 10 in which coupling structure 200 is configured to be selectively and repeatedly interconnected with, and disconnected from, veneer assembly 50. As shown, coupling structure 200 extends from bone mount 300, such as by bridging sections 230, and includes one or more couplers 210 that are configured to be selectively and repeatedly coupled to, and uncoupled from, veneer assembly 50. In some such examples, couplers 210 are configured to couple with support structure 100. For example, couplers 210 may be configured to couple with support bar 110 of support structure 100. As discussed herein, each coupler 210 may be configured to couple to veneer assembly 50 through coupling mechanism 220, in which each coupler 210 may include the first portion of coupling mechanism 220 and veneer assembly 50 may include one or more corresponding second portions of coupling mechanism 220. As a more specific example, one or more couplers 210 may couple to veneer assembly 50 through a magnetic coupling mechanism. In such examples, each of the one or more couplers 210 may include a first magnet that is configured to selectively and repeatedly magnetically couple to and uncouple from a second magnet disposed in a corresponding position along veneer assembly 50.

Figure 4:
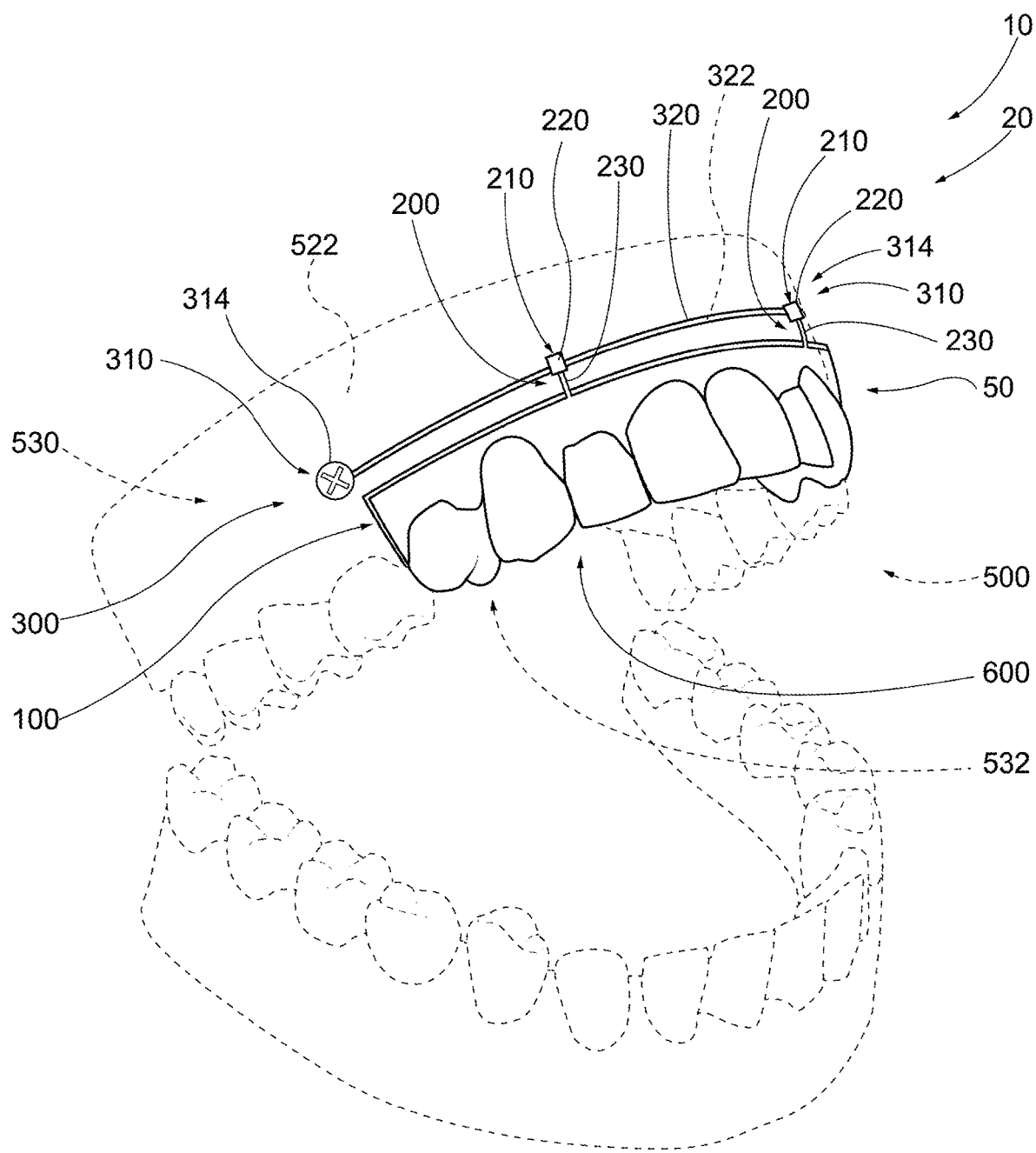
FIG. 4 is a less schematic illustration of examples of dental arch veneers temporarily installed in a user's mouth, according to the present disclosure.

FIG. 4 illustrates yet more examples of dental arch veneer 10 temporarily installed in the user's mouth 500. More specifically, in the examples of FIG. 4, dental arch veneer 10 is configured to be coupled to a bone mount 300 that includes rail 320. As shown, bone mount 300 includes two or more bone screws 310, and rail 320 is operatively coupled to, and extends between, bone screws 310. In the specific examples of FIG. 4, bone screws 310 are buccal bone screws 314 that are installed in buccal bone surfaces 522 of the user's maxilla 530, and coupling structure 200 of dental arch veneer 10 extends from veneer assembly 50, such as via bridging sections 230, to form one or more couplers 210 that are configured to be selectively and repeatedly coupled with, and decoupled from, rail 320.

Rail 320 may be of any suitable configuration for providing an anchor and/or a support to dental arch veneer 10. Rail 320 may include any suitable dimension or geometry for providing a suitable anchor for coupling structure 200. For example, while FIG. 4 illustrates rail 320 as being coupled to two bone screws 310, rail 320 may extend between, and/or be operatively coupled to, any suitable number of bone screws 310, such as three or more bone screws 310. As discussed herein, couplers 210 may be configured to couple with rail 320 through one or more coupling mechanisms 220. As a more specific example, coupling mechanism 220 may include a snap-fit coupling mechanism, in which each coupler 210 is configured to be snap-fit onto rail 320. With this in mind, in some examples, rail 320 may include a non-circular cross-section 322, which may prevent dental arch veneer 10 from rolling or pivoting about rail 320 when couplers 210 are snap-fit onto rail 320.

While FIGS. 2-4 illustrate examples in which dental arch veneer 10 is a maxillary dental arch veneer 20, is temporarily installed along the user's maxilla, and/or is configured to obscure a target region 600 that includes the user's maxillary dental arch 532, it is within the scope of the present disclosure that dental arch veneer 10 may have similar features, functions, and/or components as those discussed herein with reference to FIGS. 2-4, when dental arch veneer 10 is a mandibular dental arch veneer 30, is temporarily installed along the user's mandible, and/or is configured to obscure a target region that includes the user's mandibular dental arch.

Figure 5:
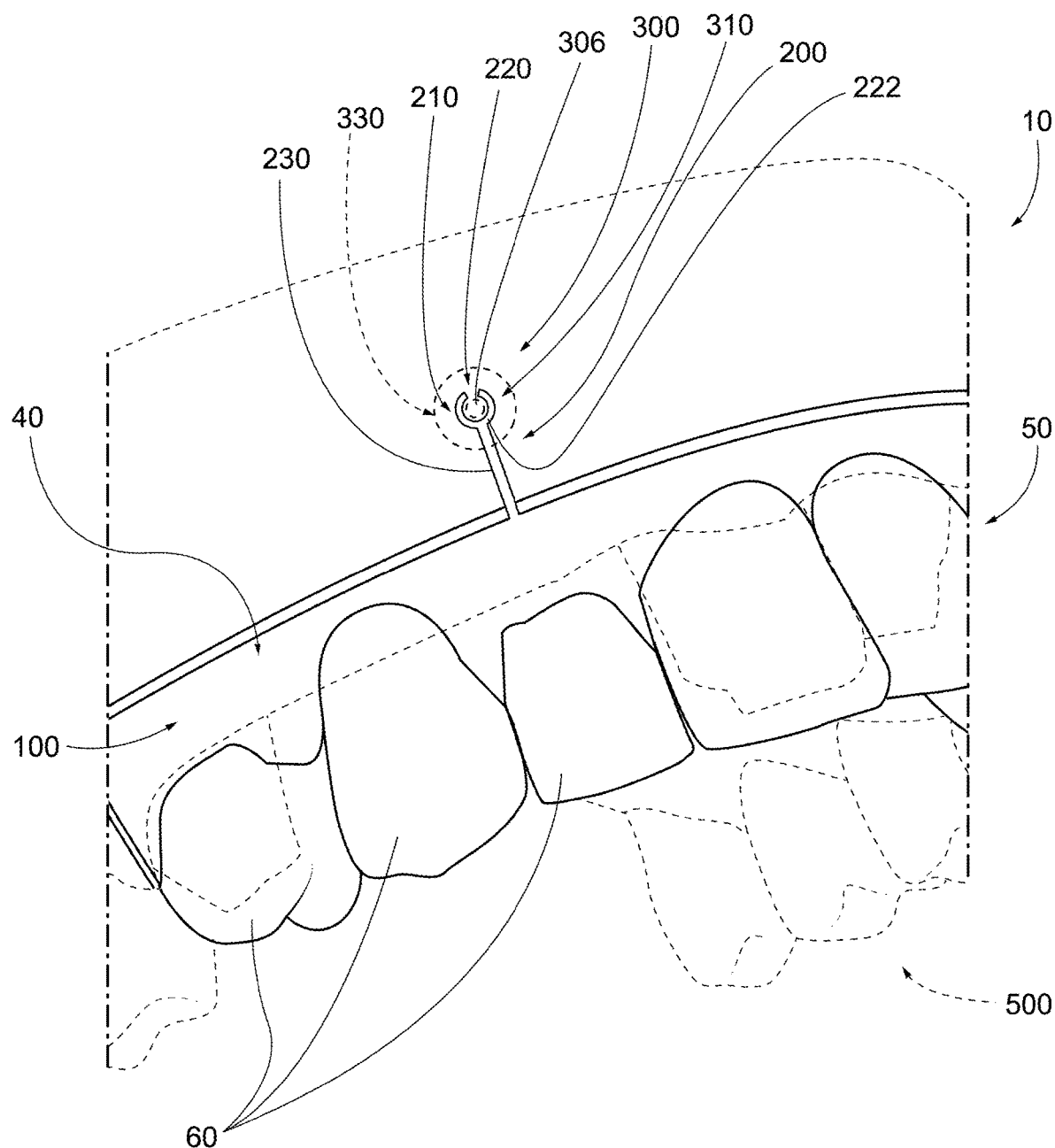
FIG. 5 is a schematic illustration showing examples of coupling mechanisms of dental arch veneers, according to the present disclosure.

Now referring to FIG. 5, shown therein is a front view illustrating examples of a portion of dental arch veneer 10 temporarily coupled to bone mount 300. As shown, dental arch veneer 10 includes veneer assembly 50 having a plurality of tooth veneers 60 that are supported by support structure 100. Dental arch veneer 10 also may include artificial gum structure 40 that may extend above, and/or in a direction of bone mount 300, from tooth veneers 60. Coupling structure 200 extends from veneer assembly 50 and/or artificial gum structure 40 to define coupler 210 that is selectively coupled to bone mount 300. More specifically, coupling structure 200 may include bridging section 230 that extends from veneer assembly 50 and/or artificial gum structure 40 to interconnect with coupler 210. Bridging section 230 may possess any suitable length and/or geometry and/or may extend from veneer assembly 50 and/or artificial gum structure 40 with any suitable angle such that coupling structure 200 positions veneer assembly 50 in a desired placement and/or orientation within the user's mouth 500.

Further shown in the examples of FIG. 5, coupler 210 is coupled to bone screw 310 of bone mount 300 through a snap-fit coupling mechanism 220, in which coupler 210 includes a receiving portion 222 of coupling mechanism 220 that is configured to be snap-fit around a coupling portion 306 of bone screw 310. As indicated in dashed lines, in some examples, bone screw 310 includes a flange 330, or cap 330, that is positioned within bone screw 310 in a vestibular direction of coupler 210, when coupler 210 is coupled to bone screw 310. When included, flange 330 may be configured to cover coupler 210 and provide a smooth surface to bone screw 310, such as to prevent abrasion to a user's lip from bone screw 310 and/or coupler 210.

Figure 6:
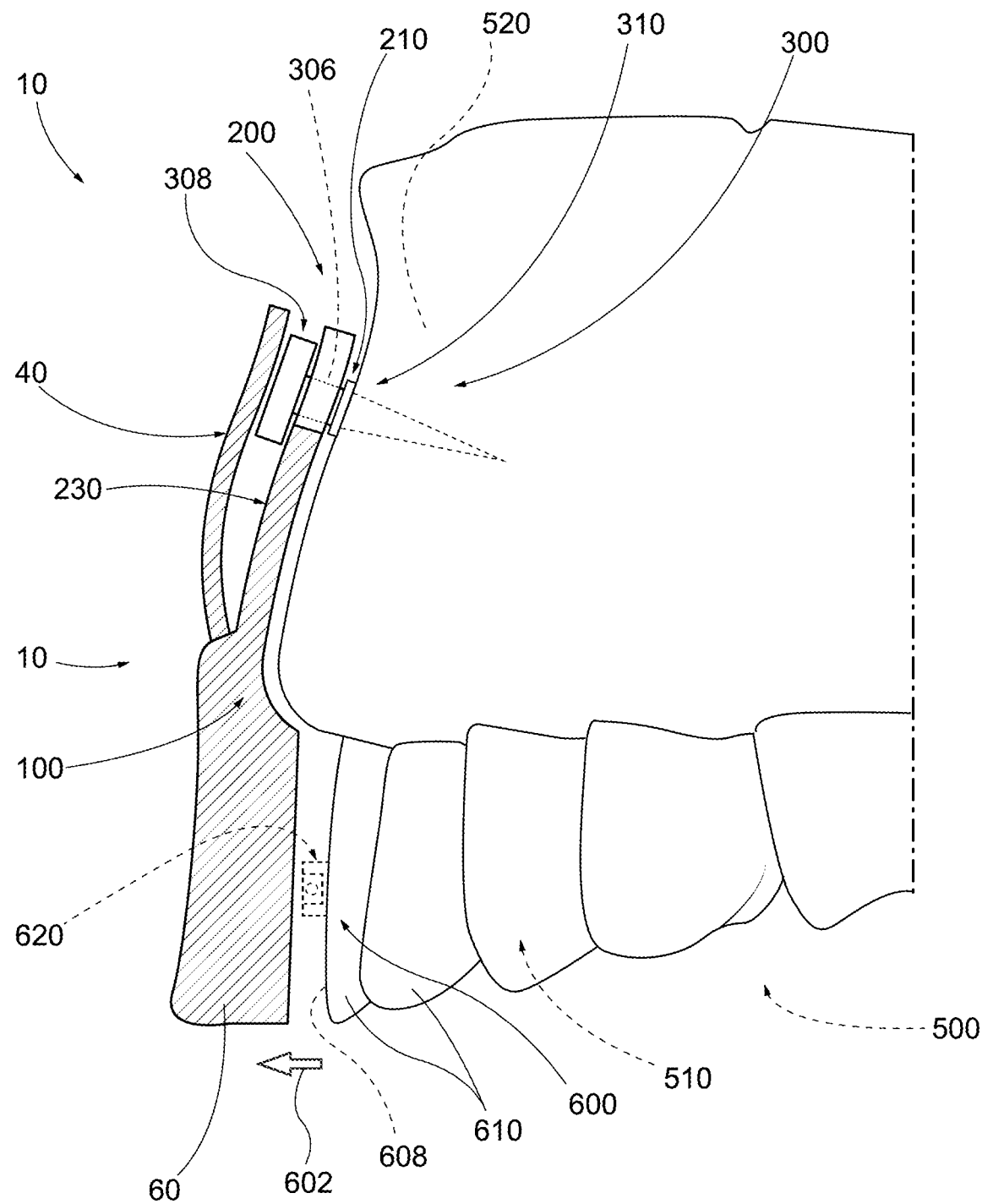
FIG. 6 is a partial cross-sectional side view illustrating examples of dental arch veneers selectively interconnected with a bone mount installed in a user's mouth, according to the present disclosure.

Turning to FIG. 6, FIG. 6 is a cutaway side-profile illustrating examples of a portion of dental arch veneer 10 temporarily coupled to a bone mount 300 that is installed in the user's mouth. As shown, bone mount 300 includes a bone screw 310 that is anchored in the bone surface 520 of the user's mouth. In the example shown, bone screw 310 is anchored in bone surface 520, vertically spaced from target region 600. Coupling structure 200 of dental arch veneer 10 includes coupler 210 that is temporarily coupled to a coupling portion 306 of bone screw 310, such that coupler 210 and coupling portion 306 are covered by flange 308. Dental arch veneer 10 also includes artificial gum structure 40 that extends from veneer assembly 50 to cover or obscure bone mount 300 and coupling structure 200. Coupling structure 200 includes bridging section 230 that interconnects veneer assembly 50 and coupler 210. In the example shown, a portion of bridging section 230 is angled in a vestibular direction from coupler 210, such that coupling structure 200 supports veneer assembly 50 spaced apart in vestibular direction 602 from the user's corresponding dental arch 510 and/or target region 600.

As further shown in FIG. 6, in some examples, orthodontic hardware 620 extends within target region 600 and may be coupled to a vestibular surface 608 of the user's teeth 610 within target region 600. In such examples, coupling structure 200 may be configured to support veneer assembly 50 spaced apart in vestibular direction 602 from orthodontic hardware 620, such that veneer assembly 50 may be non-contacting with orthodontic hardware 620 and/or such that orthodontic hardware 620 extends between the user's teeth 610 and veneer assembly 50 without contacting veneer assembly 50 and/or without being impeded by veneer assembly 50. Stated more generally, dental arch veneer 10 may be configured to obscure a target region of the user's mouth that includes orthodontic hardware 620, while not interacting with, and/or not interfering with, the orthodontic treatment provided by orthodontic hardware 620.

Figure 7:
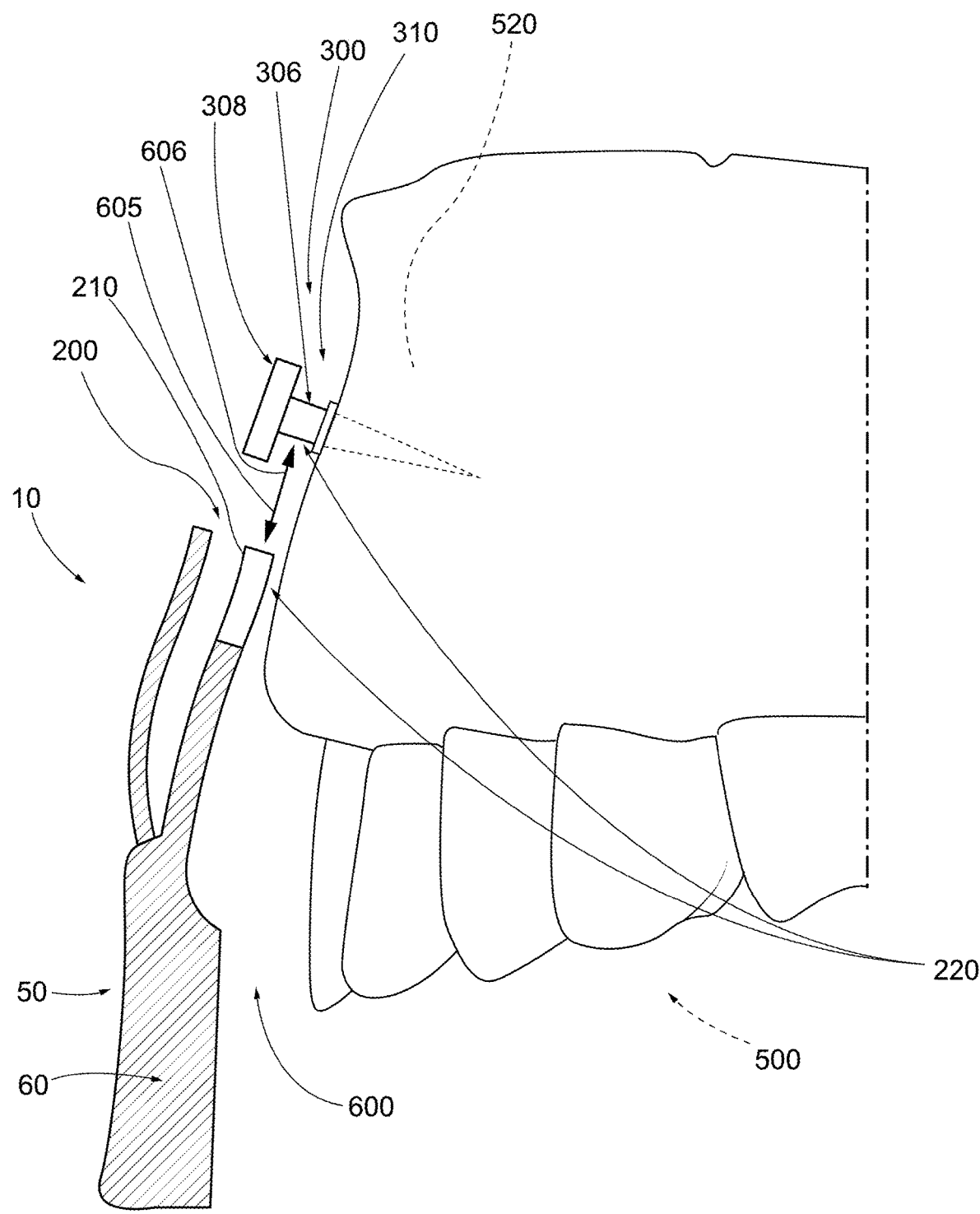
FIG. 7 is a partial cross-sectional side view illustrating examples of selectively interconnecting and disconnecting dental arch veneers to a bone mount, according to the present disclosure.

As discussed herein with reference to FIG. 1, dental arch veneer 10 is configured to be selectively and repeatedly interconnected with and disconnected from bone mount 300 such that dental arch veneer 10 may be selectively installed in and selectively removed from the user's mouth 500. FIG. 7 is a cutaway side-profile illustrating specific examples of selectively interconnecting and disconnecting dental arch veneer 10 to and from bone mount 300. As shown, bone screw 310 of bone mount 300 is anchored in bone surface 520 of the user's mouth through bone screw 310, and bone screw 310 includes coupling portion 306 that is configured to selectively couple to coupling structure 200 of dental arch veneer 10. To selectively disconnect dental arch veneer 10 from bone mount 300, coupler 210 of coupling structure 200 may be decoupled from coupling portion 306. Likewise, to selectively interconnect dental arch veneer 10 to bone mount 300, coupler 210 of coupling structure 200 may be coupled with coupling portion 306.

In the specific example shown, coupler 210 is configured to selectively and repeatedly couple with and decouple from coupling portion 306 through a snap-fit coupling mechanism. In FIG. 7, dental arch veneer 10 has been disconnected from bone mount 300 by urging dental arch veneer 10 in outward direction 605 to selectively decouple coupler 210 from coupling portion 306 of bone mount 300. To selectively interconnect dental arch veneer 10 with bone mount 300, dental arch veneer 10 may be urged in inward direction 606 to selectively couple coupler 210 to coupling portion 306. As referred to herein, outward direction 605 and inward direction 606 may be defined relative to the position of bone mount 300.

The example illustrated in FIG. 7 is a specific, non-exclusive example of a coupling mechanism 220 that may be utilized to selectively and repeatedly interconnect and disconnect dental arch veneer 10 to and from bone mount 300. As discussed herein, other coupling mechanisms 220 for selectively and repeatedly interconnecting and disconnecting dental arch veneer 10 to bone mount 300 are within the scope of the present disclosure. Depending on the particular one or more coupling mechanisms 220 that are utilized in dental arch veneer 10 and/or bone mount 300, it is within the scope of the present disclosure that substantially similar, or different, procedures to that illustrated in FIG. 7 may be utilized to selectively and repeatedly interconnect and disconnect dental arch veneer 10 to and from bone mount 300.

Turning now to FIG. 8, illustrated therein is a schematic side profile showing examples of a dental arch veneer 10 that is configured to be selectively and repeatedly interconnected with and disconnected from a bone mount 300 that is installed along a palatal bone surface 534 of the user's mouth. As shown, bone mount 300 includes one or more palatal bone screws 316 that are anchored in a palatal bone surface 534 (i.e., roof of the user's mouth), and coupling structure 200 of dental arch veneer 10 includes one or more couplers 210 that are selectively coupled with bone mount 300. Further shown, coupling structure 200 includes bridging section 230 that extends between couplers 210 and veneer assembly 50 to support veneer assembly 50 from palatal bone screws 316. Coupling structure 200 positions veneer assembly 50 within the user's mouth, such that veneer assembly 50 may present the desired oral appearance in a vestibular direction of target region 600. More specifically, bridging section 230 may be shaped to peripherally extend around target region 600 and interconnect with a rear, or an inside, portion of veneer assembly 50 to support veneer assembly 50 in a desired position relative to target region 600.

Target region 600 of FIG. 8 may include one or more physical teeth, such as misaligned teeth 614, damaged teeth 612, and/or non-natural fixtures 622. Additionally or alternatively, target region 600 may include a surgical site 618 and/or gaps 616 corresponding to one or more missing teeth. Surgical site 618 may include a site within the user's mouth that is undergoing, healing from, and/or being prepared for a surgical procedure. As examples, surgical site 618 may include one or more pre-implants, a surgical wound, a pre-surgery site, an active surgery site, and/or combinations thereof. With this in mind, in some examples, surgical site 618 includes, and/or is defined by, one or more gaps 616 corresponding to one or more missing teeth.

When target region 600 includes one or more of misaligned teeth 614, damaged teeth 612, and/or non-natural fixtures 622, coupling structure 200 may be configured to support veneer assembly 50 spaced apart in a vestibular direction from target region 600 and/or the misaligned teeth 614, damaged teeth 612, and/or non-natural fixtures 622. Alternatively, in some examples, target region 600 only includes gaps 616 and/or surgical sites 618, and target region 600 does not include physical teeth. In some such examples, coupling structure 200 may be configured to support veneer assembly 50 such that veneer assembly 50 at least partially extends within target region 600. Stated another way, when there are no physical teeth within target region 600, coupling structure 200 may support veneer assembly 50 with a vestibular surface of veneer assembly 50 generally aligned with a vestibular surface of the user's corresponding dental arch 510 that may surround target region 600. In this way, dental arch veneer 10 may provide an appearance to the user's mouth that no teeth are missing from the user's maxillary dental arch veneer 20. That said, when veneer assembly 50 is supported by coupling structure 200 to extend at least partially within target region 600, and target region 600 only includes a surgical site 618, veneer assembly 50 may be positioned by coupling structure 200 to be non-contacting with and/or not interfering with surgical site 618.

Figure 9:
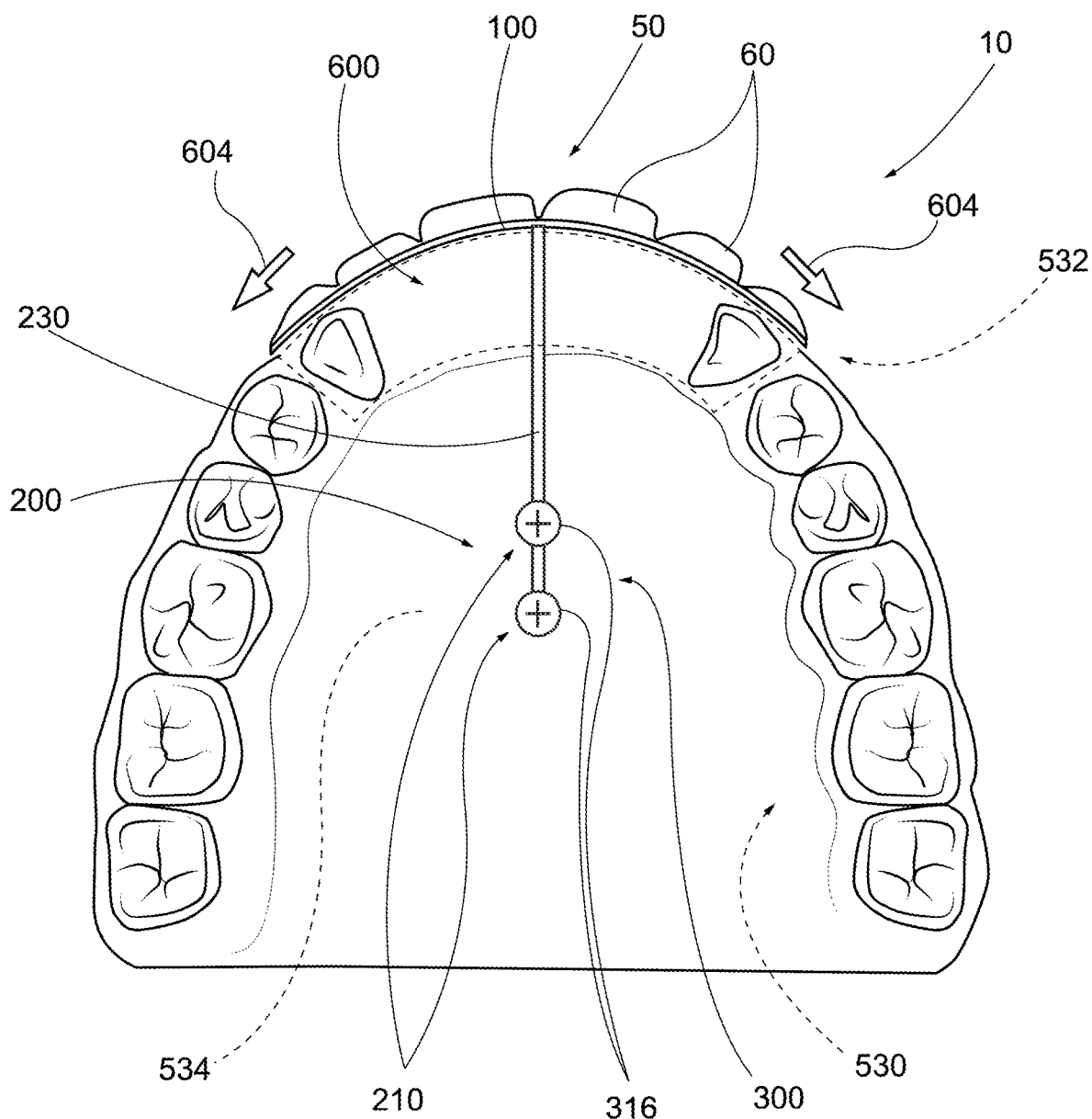
FIG. 9 is a schematic bottom plan view illustrating examples of dental arch veneers temporarily installed in a user's mouth.

FIG. 9 provides a bottom-plan schematic view illustrating examples of a dental arch veneer 10 that is configured to be selectively and repeatedly interconnected with and disconnected from a bone mount 300 that is installed along a palatal bone surface 534 of the user's maxilla 530. More specifically, FIG. 9 illustrates examples in which veneer assembly 50 is supported spaced apart in a vestibular direction from the user's maxillary dental arch 532 by coupling structure 200. As shown, bone mount 300 includes one or more palatal bone screws 316 that are anchored to palatal bone surface 534, and coupling structure 200 of dental arch veneer 10 includes one or more couplers 210 that are selectively coupled to bone mount 300. Further shown, coupling structure 200 also includes bridging section 230 that interconnects couplers 210 to veneer assembly 50, and veneer assembly 50 is supported by coupling structure 200 spaced apart in a vestibular direction of target region 600. More specifically, in the example shown, veneer assembly 50 includes a plurality of tooth veneers 60 that are supported by support structure 100 in an arcuate shape that generally corresponds to a shape of the user's maxillary dental arch 532, and coupling structure 200 supports veneer assembly 50 spaced apart in a vestibular direction of maxillary dental arch 532. In some examples, veneer assembly 50 may be configured to extend in posterior directions 604 beyond target region 600, such that target region 600 is obscured even when the user's mouth is viewed from a side, or skew, angle.

As discussed herein with reference to FIG. 1, support structure 100 may extend along any suitable region of dental arch veneer 10 and/or may interconnect with any suitable portion coupling structure 200. Likewise, support structure 100 may be configured to extend within, or along, any suitable one or more regions of the user's mouth.

Figure 10:
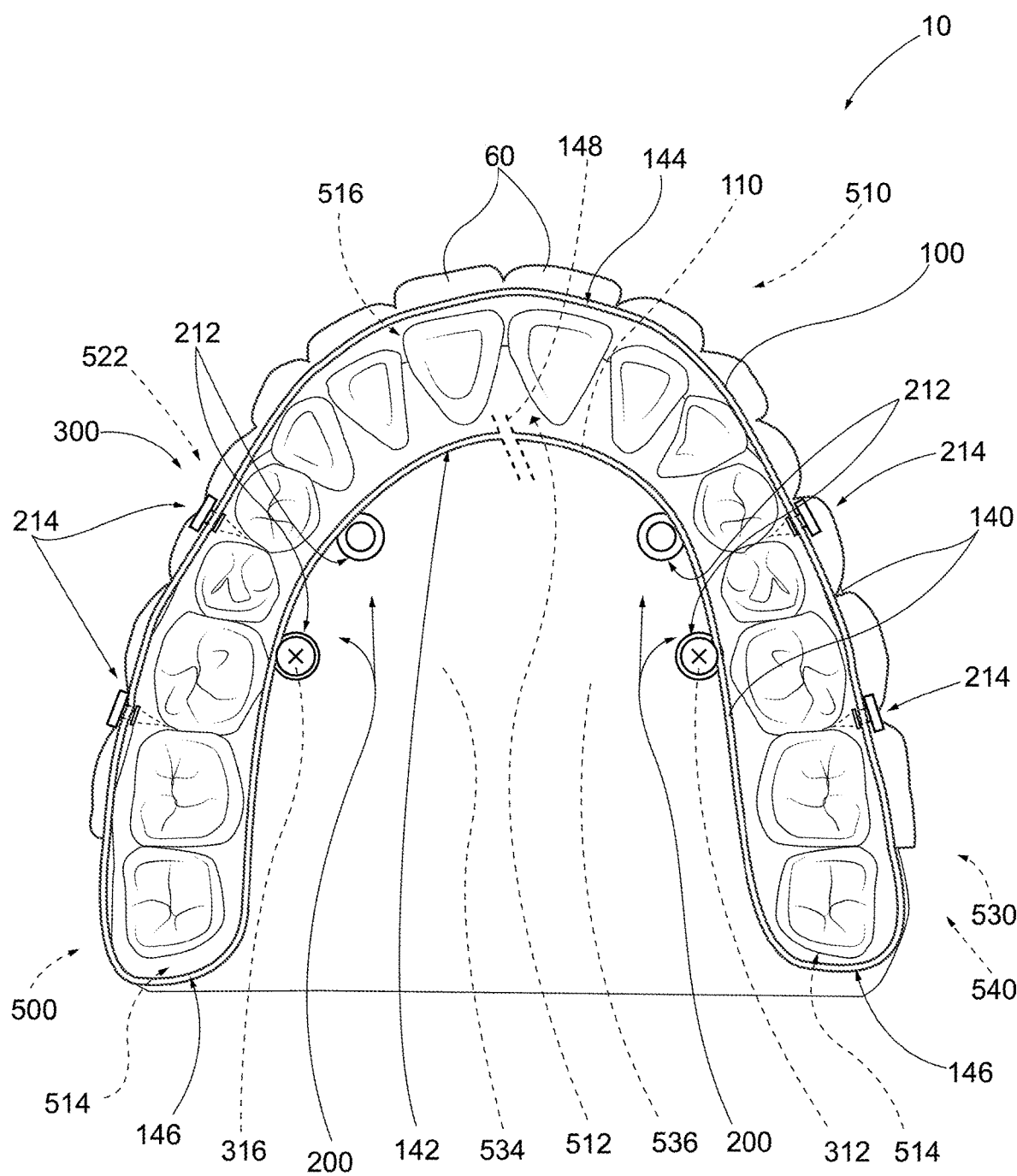
FIG. 10 is a schematic plan view illustrating examples of dental arch veneers temporarily installed in a user's mouth, according to the present disclosure.

As shown in the examples of FIG. 10, support structure 100 may be configured to form a loop 140 that extends around, or encircles, the user's corresponding dental arch 510. More specifically, support structure 100 may define a loop 140 that is configured to extend around lingual 512, posterior 514, and vestibular 516 regions of the user's corresponding dental arch 510. Loop 140 of support structure 100 may define a vestibular region 144 that extends around vestibular region 516 of the user's corresponding dental arch 510, and one or more tooth veneers 60 may extend from, and/or be coupled to, vestibular region 144 of support structure 100. Similarly, loop 140 of support structure 100 may define a lingual region 142, which extends around a lingual region 512 of the user's corresponding dental arch 510, and posterior regions 146, which extend around posterior regions 514 of the user's corresponding dental arch 510.

When support structure 100 forms loop 140, coupling structure 200 may extend from, and/or interconnect with, any suitable region of loop 140. As shown in FIG. 10, in some examples, coupling structure 200 includes one or more lingual couplers 212 that extend from, or interconnect with, one or more portions of lingual region 142 of loop 140. Additionally or alternatively, coupling structure 200 may include one or more vestibular couplers 214 that extend from, and/or interconnect with, one or more portions of vestibular region 144 of loop 140, and vestibular couplers 214 may be configured to interconnect with a bone mount 300 that is installed along buccal bone surfaces 522 of the user's maxilla 530 or mandible 540. As discussed herein, support structure 100 may include support bar 110. When included, support bar 110 may define at least a portion of loop 140. As a more specific example, and as shown in FIG. 10, support bar 110 may define posterior 146 and lingual 142 regions of loop 140, and one or more couplers 210 of coupling structure 200 may extend from, and/or interconnect with, support bar 110.

When dental arch veneer 10 is a maxillary dental arch veneer 20, lingual couplers 212 that may extend from, and/or interconnect with, lingual region 142 of loop 140 may be configured to interconnect with any suitable one or more portions of a bone mount 300 that is installed in the user's palatal bone surface 534, such as one or more palatal bone screws 316. Similarly, when dental arch veneer 10 is mandibular dental arch veneer 30, lingual couplers 212 that may extend from, and/or interconnect with, lingual region 142 of loop 140 may be configured to interconnect with any suitable one or more portions of a bone mount 300 that is installed along a lingual bone surface 536 of the user's mandible 540, such as one or more lingual bone screws 312.

In some examples, loop 140 may define a continuous loop. As indicated in dashed lines in FIG. 10, in other examples, loop 140 may be a broken, or non-continuous, loop 148. For example, lingual region 142 of loop 140 may terminate to form two opposing ends, with each opposing end being interconnected with a respective coupler 210.

As discussed herein, dental arch veneer 10 may be configured to be temporarily installed in the user's mouth while one or more teeth within the target region are undergoing orthodontic rearrangement. Additionally or alternatively, dental arch veneer 10 may be configured to be temporarily installed in the user's mouth while bone structure that is proximate, or included in, the target region is undergoing a skeletal expansion and/or a skeletal contraction procedure. Stated another way, dental arch veneer 10 may be configured to be temporarily installed in the user's mouth while the user's corresponding dental arch, and/or bone structure proximate thereto, is undergoing a procedure that alters a dimension of the corresponding dental arch and/or proximate bone structure. When dental arch veneer 10 is configured to be temporarily installed in the user's mouth during any such procedure, dental arch veneer 10 also may be configured to be non-interacting with, and/or not invasive to, the procedure.

Figure 11:
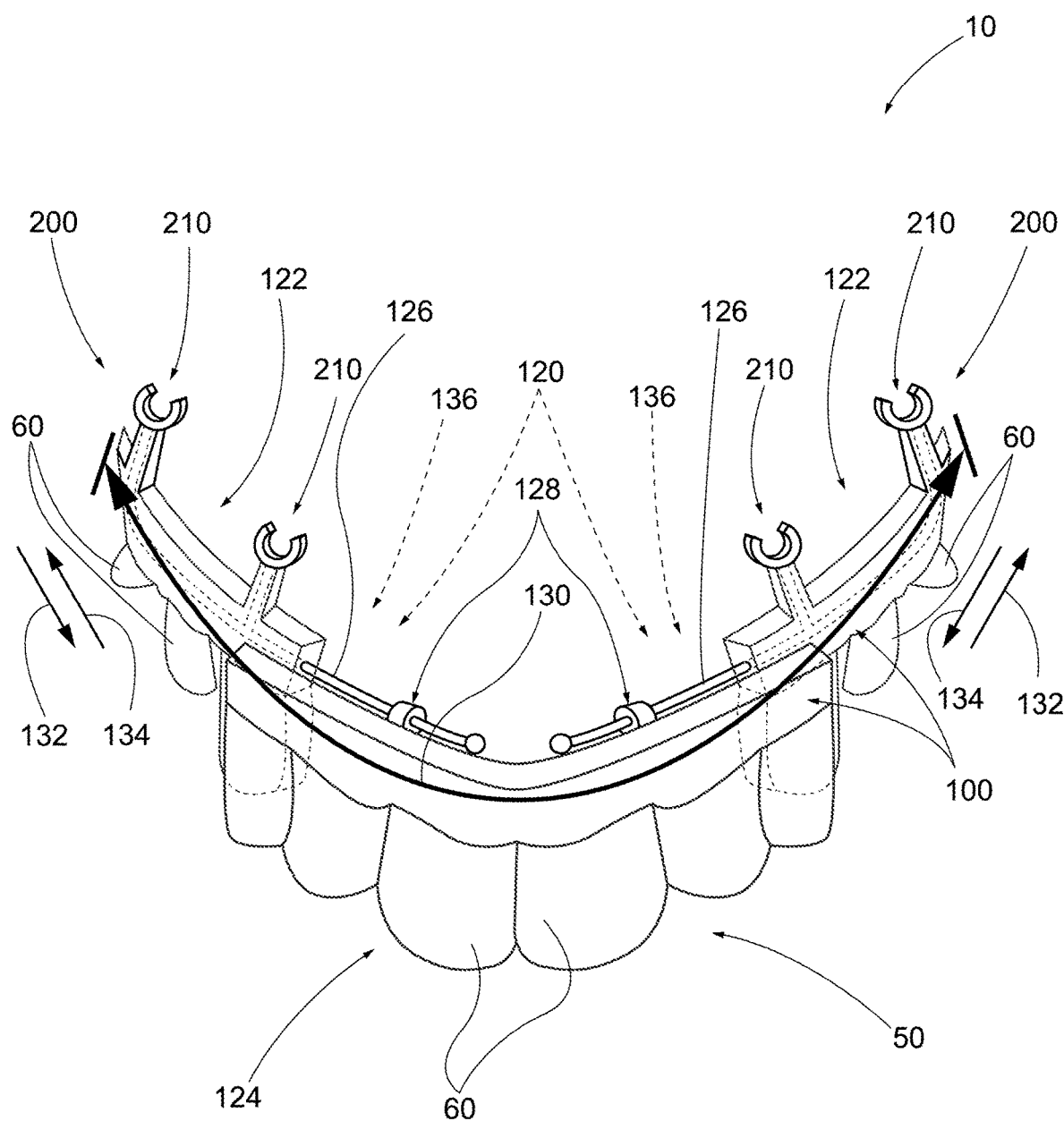
FIG. 11 illustrates examples of dental arch veneers having an adjustment mechanism, according to the present disclosure.
Figure 12:
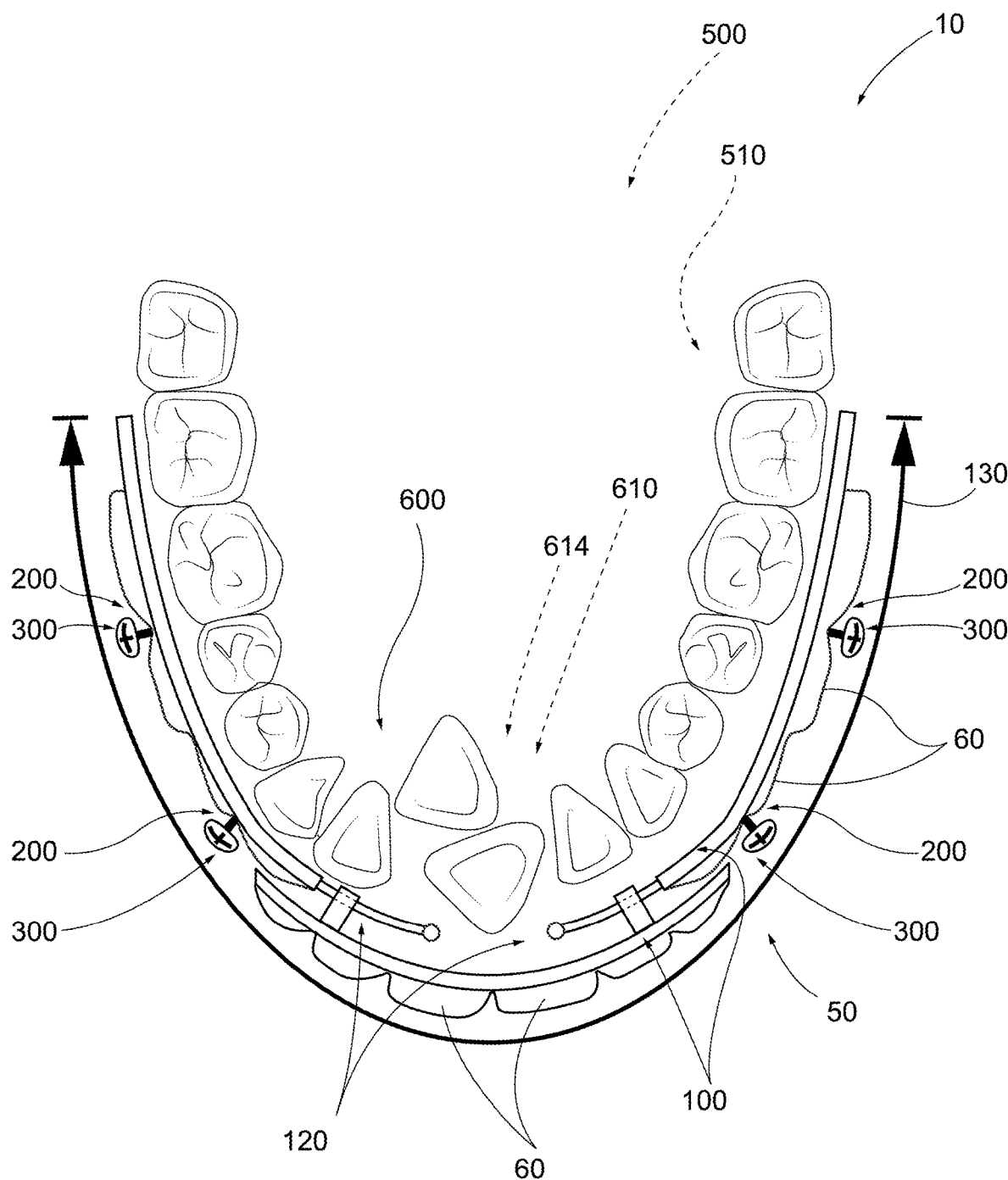
FIG. 12 illustrates examples of dental arch veneers having an adjustment mechanism temporarily installed in a user's mouth, according to the present disclosure.
Figure 13:
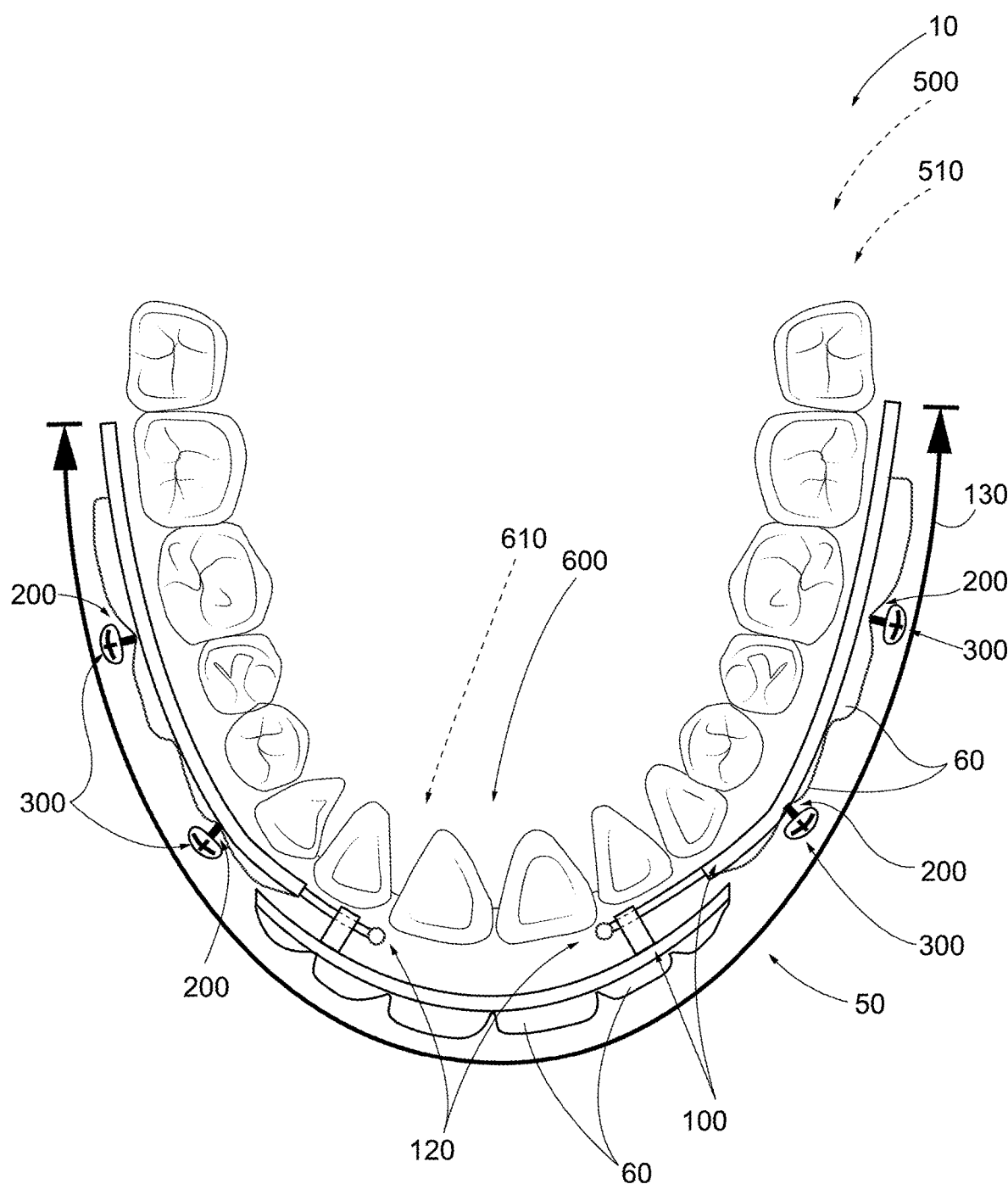
FIG. 13 illustrates examples of dental arch veneers having an adjustment mechanism temporarily installed in a user's month, according to the present disclosure.

In view of the above, as schematically shown in FIG. 1 and less schematically illustrated in the examples of FIGS. 11-13, support structure 100 of dental arch veneer 10 may include an adjustment mechanism 120 that is configured to permit selective adjustment of an arch span 130 of dental arch veneer 10. As discussed herein, arch span 130 may be defined as a distance extending along dental arch veneer 10 between posterior ends of dental arch veneer 10. Adjustment mechanism 120 may be configured to permit expansion 132 of arch span 130 and/or may be configured to permit contraction 134 of arch span 130. Put differently, expansion 132 of arch span 130 by adjustment mechanism 120 may permit dental arch veneer 10 to be temporarily installed in the user's mouth when a region of the user's mouth that includes, and/or is proximate, the target region is undergoing an expansion orthodontic procedure that causes the user's corresponding dental arch, and/or bone structure proximate thereto, to expand. Likewise, contraction 134 of arch span 130 by adjustment mechanism 120 may permit dental arch veneer 10 to be temporarily installed in the user's mouth while a region of the user's mouth that includes, or is proximate, the target region is undergoing a contraction orthodontic procedure that causes the user's corresponding dental arch, and/or bone structure thereto, to contract. In some examples, adjustment mechanism 120 is configured to permit incremental adjustment of arch span 130, in which arch span 130 may be adjusted by adjustment mechanism 120 when dental arch veneer 10 is removed from the user's mouth.

In some examples, a contractive and/or an expansive orthodontic procedure may cause one or more positions of the bone mount to shift. With this in mind, adjustment mechanism 120 may be configured to permit coupling structure 200 to interconnect veneer assembly 50 to the bone mount while the one or more positions of the bone mount are shifting due to an orthodontic procedure. For example, as shown in FIG. 11, when dental arch veneer 10 includes adjustment mechanism 120, support structure 100 may include one or more adjustable portions 122 that are configured to be selectively and operatively shifted relative to one another to permit adjustment of arch span 130. In such examples, coupling structure 200 may extend from adjustable portions 122 to form couplers 210. In this way, selective and operative shifting of adjustable portions 122 relative to one another simultaneously may permit adjustment of the relative position of couplers 210. Stated another way, adjustment of arch span 130 by adjustment mechanism 120 may be configured to accommodate movement of the bone mount during an orthodontic procedure by permitting selective and operative adjustment of the positions of couplers 210.

Dental arch veneer 10 may include any suitable adjustment mechanism 120 to permit dental arch veneer 10 to be temporarily installed in the user's mouth, and to permit veneer assembly 50 to obscure the target region, when the user is undergoing an orthodontic procedure that alters the dimensions of the user's corresponding dental arch and/or bone structure proximate thereto. Within this context, the term "permit" may include dental arch veneer 10 being configured to not interfere with, retard, and/or otherwise interact with the orthodontic procedure. Examples of suitable adjustment mechanisms 120 include a sliding adjustment mechanism, a ratcheting adjustment mechanism, a telescoping adjustment mechanism, and/or a turnbuckle adjustment mechanism. Adjustment mechanism 120 additionally may include a locking mechanism 136 that is configured to selectively and operatively secure support structure 100 with any desirable degree of extension corresponding to any desired arch span 130 of dental arch veneer 10.

FIG. 11 illustrates specific examples of adjustment mechanism 120, in which veneer assembly 50 includes a support structure 100 having two adjustable portions 122 that support one or more tooth veneers 60. Veneer assembly 50 also includes central veneer portion 124 having a central portion of support structure 100 from which a plurality of tooth veneers 60 extend. In this example, each adjustable portion 122 includes a rod 126 that is received within a receiver 128 disposed on central veneer portion 124. Each receiver 128 may be configured to permit the respective rod 126 to selectively and operatively translate within receiver 128, thereby adjusting arch span 130 of dental arch veneer 10. In some examples, rods 126 and/or receivers 128 include a locking mechanism 136 that is configured to selectively secure the rod at a desired extension relative to the receiver.

FIGS. 12 and 13 illustrate specific examples of dental arch veneer 10 being temporarily installed in the user's mouth 500 while the user is undergoing an orthodontic or surgical expansion procedure for correcting one or more misaligned teeth 614. As shown in FIG. 12, target region 600 includes a region of misaligned teeth 614 that are overlapping due to crowding and/or an undersized dental arch. Coupling structure 200 interconnects veneer assembly 50 to bone mount 300 and supports veneer assembly 50 spaced apart in a vestibular direction from the user's corresponding dental arch 510. As further shown, support structure 100 of veneer assembly 50 includes adjustment mechanism 120 to permit veneer assembly 50 to obscure target region 600 during the orthodontic expansion procedure. More specifically, during an early initial stage of the orthodontic expansion procedure that is shown in FIG. 12, the user's dental arch may be in a contracted state, and arch span 130 of dental arch veneer 10 correspondingly may be contracted by adjustment mechanism 120, such that dental arch veneer 10 is shaped and/or sized to correspond to the user's corresponding dental arch 510. FIG. 13 illustrates an example of a later stage of the orthodontic expansion procedure, in which the position of the misaligned, or overlapping, teeth of FIG. 12 have been shifted into alignment and the user's corresponding dental arch 510 correspondingly has been expanded. As further shown in FIG. 13, arch span 130 of dental arch veneer 10 has been selectively expanded by adjustment mechanism 120, such that dental arch veneer 10 is shaped and/or sized to correspond to the user's expanded corresponding dental arch 510.

Figure 14:
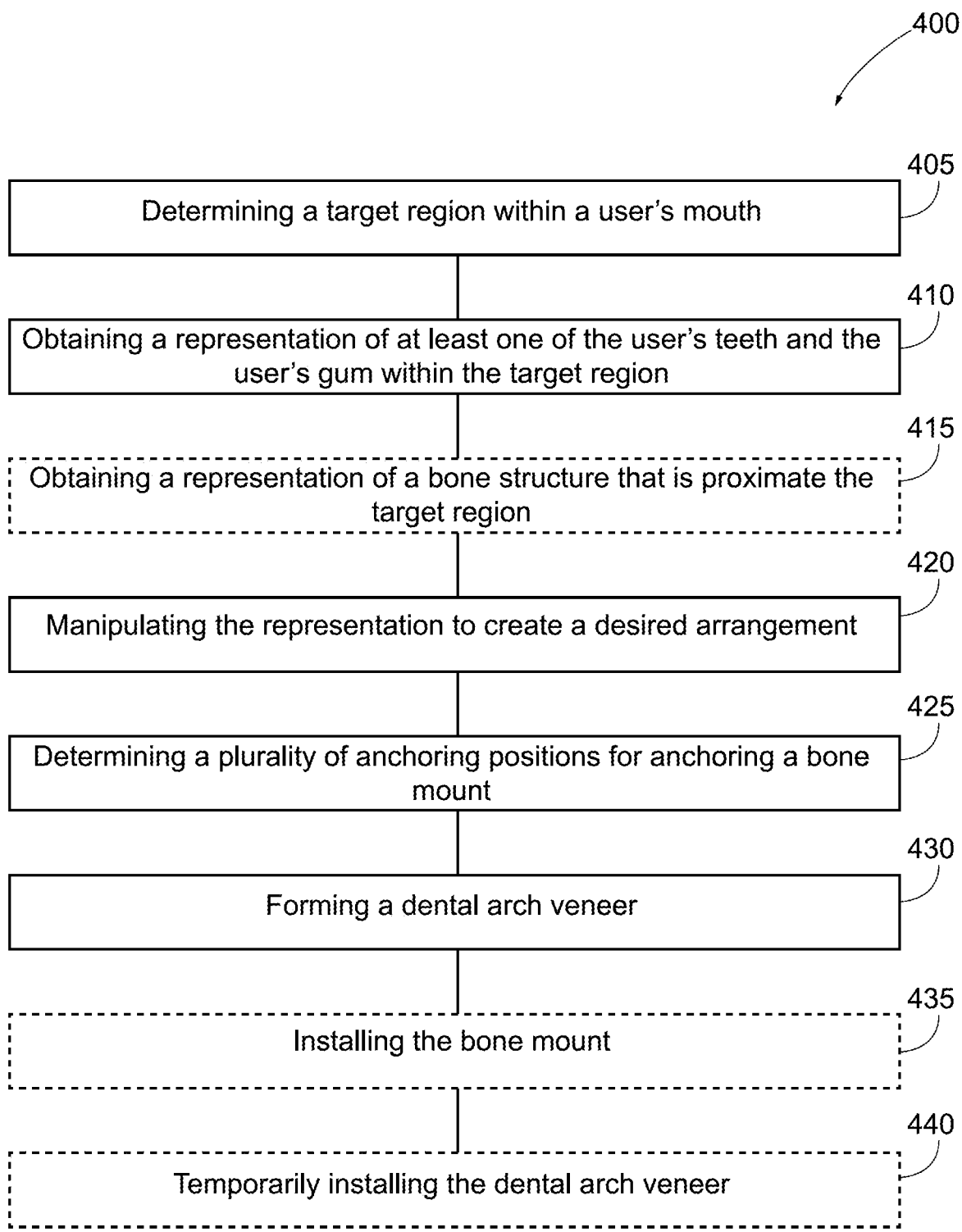
FIG. 14 is a flowchart schematically representing examples of methods for fabricating dental arch veneers, according to the present disclosure.

FIG. 14 is a flow chart schematically illustrating examples of methods 400 for fabricating, and optionally utilizing, dental arch veneer 10, according to the present disclosure. Each step or portion of methods 400 may be performed to fabricate, and optionally install, dental arch veneer 10, and/or portions thereof, that are discussed in detail herein with reference to FIGS. 1-13.

Methods 400 include determining a target region within the user's mouth at 405, obtaining a representation of at least one of the user's teeth and the user's gum within the target region at 410, manipulating the representation to create a desired arrangement of the user's teeth and gum within the target region at 420, determining a plurality of anchoring positions within a bone structure that is proximate the target region of anchoring a plurality of screws of a bone mount at 425, and forming the dental arch veneer based on the anchoring positions and the desired arrangement at 430. Methods 400 optionally include obtaining a representation of a bone structure that is proximate the target region at 415, installing the bone mount at 435, and/or temporarily installing the dental arch veneer in the user's mouth at 440.

Determining a target region within the user's mouth at 405 includes determining a target region that is to be obscured by the veneer assembly of the dental arch veneer. As discussed herein, the target region may include any suitable region of the user's mouth, such as regions of the user's maxilla or mandible. As examples, the target region may include one or more of the user's teeth, such one or more damaged teeth, one or more misaligned teeth, one or more gaps corresponding to missing teeth, one or more non-natural fixtures, and/or one or more surgical sites. Stated another way, the target region may include any suitable region of the user's mouth that the user may desire to have obscured by the veneer assembly. The determining at 405 may be performed by any suitable party. In some examples, the determining at 405 is performed by a dental practitioner, such as an orthodontist, a surgeon, a dentist, and/or a technician. In some such examples, the determining is based on an expressed desire of the user, which may be communicated to the practitioner. Additionally or alternatively, the determining at 405 may be determined by a practitioner based upon an ongoing, a future, or a previous orthodontic or dental procedure that is being performed on the user's mouth. As another example, the determining at 405 may be performed solely by the user, and the user may submit the desired target region to the practitioner.

The determining at 405 may be performed with any suitable sequence or timing within methods 400. As examples, the positioning at 405 may be performed prior to obtaining the representation of the user's teeth and/or gum at 410, obtaining the representation of the user's bone structure at 415, and/or prior to determining the plurality of anchoring positions at 425.

With continued reference to FIG. 14, methods 400 include obtaining a representation of at least one of the user's teeth and the user's gum within the target region at 410. Illustrative, non-exclusive examples of the target region are illustrated in FIGS. 1-2, 6, and 8-12.

The obtaining at 410 may be performed in any suitable manner such that a suitable representation of the target region of the user's mouth is obtained. As examples, the obtaining may include obtaining one or more images of the target region, and/or obtaining a mold of the target region. Examples of methods for obtaining a mold of a user's teeth that may be utilized during the obtaining at 410 are disclosed in U.S. Pat. No. 7,771,640; the entirety of which is hereby incorporated by reference. The obtaining at 410 additionally or alternatively may include obtaining one or more digital scans of the target region and additionally or alternatively may include one or more computer-aided tomography scans (CAT scans), images produced by magnetic resonance imaging (MRI), and/or digitalized X-ray scans. Examples of methods for obtaining a digital representation of a user's teeth that may be utilized during the obtaining at 410 are disclosed in U.S. Pat. No. 6,450,807; the entirety of which is hereby incorporated by reference.

The obtaining at 410 may be performed by any suitable party. In some examples, the obtaining at 410 is performed by a dental practitioner, such as an orthodontist, a surgeon, a dentist, and/or a technician. Additionally or alternatively, the obtaining at 410 may be performed by the user, in which the user submits the representation to the practitioner. As an example, the obtaining at 410 may include the user taking one more images of the target region and submitting the one or more images to the dental practitioner. In such an example, the providing of the images to the dental practitioner also may be considered to be a version of the dental practitioner receiving the representation.

The obtaining at 410 may be performed with any suitable sequence or timing within methods 400. As examples, the obtaining at 410 may be performed subsequent to the determining at 405, and/or prior to the manipulating at 420. Additionally or alternatively, the obtaining 410 may be performed prior to, and/or substantially simultaneously with the obtaining at 415, and/or prior to, and/or substantially simultaneously with, the determining at 425.

Turning back to FIG. 14, in some examples, methods 400 include obtaining a representation of a bone structure that is proximate to the target region at 415. In some examples, the representation of the bone structure that is obtained during the obtaining at 415 is utilized during the determining the plurality of anchoring positons for anchoring the bone mount at 425. With this in mind, the obtaining at 415 may be performed prior to the determining at 425. Additionally or alternatively, the obtaining at 415 may be performed substantially simultaneously with the obtaining at 410, and/or subsequent to the determining at 405. The obtaining at 410 also may be performed by any suitable party, including a dental practitioner, such as a dentist, an orthodontist, a surgeon, and/or a technician.

The obtaining at 415 may include obtaining a representation of the user's maxilla or mandible. As a more specific example, the obtaining at 415 may include obtaining a representation of one or more bone surfaces of the user's maxilla or mandible in which the bone mount may be installed. Examples of suitable bone surfaces include buccal bone surfaces, labial bone surfaces, a palatal bone surface, and/or lingual bone surfaces.

The obtaining at 415 may be performed in any suitable manner such that a suitable representation of the user's bone structure proximate to the target region is obtained. As an example, the obtaining at 415 may include obtaining a digital scan, such as a digitalized X-ray scan, of the user's bone structure proximate to the target region.

Turning back to FIG. 14, methods 400 further include manipulating the representation of the at least one of the user's teeth and the user's gum within the target region to create a desired arrangement of the user's teeth and gum within the target region at 420. The manipulating at 420 may be performed with any suitable sequence or timing within methods 400. As examples, the manipulating at 420 may be performed subsequent to the obtaining at 410, subsequent to the obtaining at 415, and/or prior to the determining at 425, and/or prior to the forming at 430.

The manipulating at 420 may include manipulating an arrangement, shape, size, and/or relative position of the user's one or more teeth within the target region to produce a desired arrangement. Additionally or alternatively, as discussed herein in some examples, the target region includes one or more gaps corresponding to missing teeth, and in such examples, the manipulating at 420 may include adding one or more teeth to the representation to fill the gaps. The manipulating at 420 may include manipulating the shape, size, and/or color of the representation of the user's gum within the target region to produce a desired gum appearance.

The manipulating at 420 may be performed in any suitable manner. In some examples, the manipulating at 420 is performed manually. Additionally or alternatively, the manipulating may be performed digitally. For example, when the obtaining at 405 includes obtaining a mold of the user's teeth, the manipulating may include manually manipulating the mold to produce a desired arrangement of the user's teeth and gum within the target region. Additionally or alternatively, when the obtaining at 405 includes obtaining one or more digital scans of the user's teeth within the target region, the manipulating may include digitally manipulating the digital scans, and/or a digital representation of the user's teeth within the target region that is based on the digital scans to produce the desired arrangement of the user's teeth within the target region. Examples of methods for manipulating a digital representation of a user's teeth to produce a desired arrangement of a user's teeth that may be utilized during the manipulating at 420 are disclosed in U.S. Pat. No. 6,450,807, the entirety of which has been incorporated by reference herein.

With continued reference to FIG. 14, methods 400 further include determining a plurality of anchoring positions within the bone structure of the user's mouth that is proximate to the target region for anchoring a plurality of bone screws of the bone mount at 425. As discussed herein, each anchoring position may be located in any suitable region of the user's maxilla or mandible. As examples, the plurality of anchoring positions may include anchoring positions located along buccal bone surfaces, labial bone surfaces, a palatal bone surface, and/or lingual bone surfaces of the user's maxilla or mandible. Thus, the determining at 425 may include determining an installation position for the bone mount and/or determining a region of the user's bone structure along which the bone mount is to be installed.

The determining at 425 may be performed in any suitable manner and/or by any suitable party. As an example, the determining at 425 may be performed manually by a dental practitioner, such as a dentist, an orthodontist, a surgeon, and/or a technician, based on a visual inspection of the user's mouth. Additionally or alternatively, when methods 400 include the obtaining the representation of the bone structure that is proximate to the target region at 415, the determining at 425 may be at least partially based on the representation obtained at 415. The determining at 425 may include determining the bone health of the user's bone structure proximate the target region, and selecting the anchoring positions based on regions of the bone structure that may stably or safely receive one or more bone screws.

The determining at 425 may be performed with any suitable sequence or timing within methods 400. As examples, the determining at 425 may be performed subsequent to the determining at 405, prior to the forming at 430, prior to the installing at 434, and/or prior to the installing at 440.

As shown in FIG. 14, methods 400 include forming the dental arch veneer based on the anchoring positions and the desired arrangement of the user's teeth and gum at 430. The forming at 430 may include forming a dental arch veneer that includes any suitable combination of features, components, and/or functions to dental arch veneer 10 discussed in detail herein with reference to FIGS. 1-13.

As discussed herein, the dental arch veneer is configured to be temporarily installed in the user's mouth and provide the desired oral appearance to the user's mouth. More specifically, the dental arch veneer includes a veneer assembly that includes one or more tooth veneers and a support structure that is operatively coupled to the one or more tooth veneers and configured to support the one or more tooth veneers. The dental arch veneer also includes a coupling structure that is configured to interconnect the veneer assembly to the bone mount and may support the veneer assembly spaced apart in a vestibular direction from the dental arch of the user that corresponds to the target region. The coupling structure further is configured to permit the veneer assembly to be selectively and repeatedly interconnected with and disconnected from the bone mount without damaging the dental arch veneer.

The forming at 430 may include forming the maxillary dental arch veneer or forming the mandibular dental arch veneer, depending on the target region selected during the determining at 405. Similarly, the forming at 430 may include forming a dental arch veneer that is configured to be selectively and repeatedly interconnected with and disconnected from the bone mount that is configured to be anchored within the bone structure proximate to the target region, such as determined during the determining at 425.

As referred to herein, forming the dental arch veneer "based" on the desired arrangement of teeth may include forming the veneer assembly with the one or more tooth veneers supported by the support structure in the desired arrangement. In some examples, forming the veneer assembly includes forming the support structure into a desired shape and operatively affixing the one or more tooth veneers to the support structure in the desired arrangement. Additionally or alternatively, forming the veneer assembly may include forming the support structure and one or more tooth veneers in a single step, and optionally manipulating the veneer assembly into the desired arrangement, once formed.

Similarly, forming the dental arch veneer based on the anchoring positions of the bone mount may include forming the coupling structure to be configured to interconnect with the bone mount, when the bone mount is installed in the bone mount installation position, which may be selected during the determining at 425. Stated differently, forming the dental arch veneer may be based on the anchoring positions of the bone screws of the bone mount. Thus, forming the coupling structure may include forming one or more portions of the coupling structure, such as the bridging section and/or the couplers, are sized, oriented, and/or shaped such that coupling structure may interconnect the veneer assembly to the bone mount and support the veneer assembly in a desired position within the user's mouth. As discussed in more detail herein, in some examples, the coupling structure may include a plurality of couplers that are configured to be selectively and repeatedly coupled to and uncoupled from the bone mount. In such examples, the forming at 430 includes forming the plurality of couplers.

The forming at 430 may be performed with any suitable sequence or timing within methods 400. As examples, the forming at 430 may be performed subsequent to the manipulating at 420, subsequent to the determining at 425, and/or subsequent to the obtaining at 415. Additionally or alternatively, the forming at 430 may be performed prior to the installing at 435, prior to the installing at 440, and/or subsequent to the installing at 435.

The forming at 430 my include forming the dental arch veneer in any suitable manner. In some examples, the forming at 430 includes separately forming one or more portions or components of the dental arch veneer and operatively coupling the separately formed portions to form the dental arch veneer. As examples, the forming at 430 may include separately forming the support structure, the coupling structure, the tooth veneers, and/or the artificial gum structure and operatively coupling the separately formed portions. In other examples, the forming at 430 includes forming the dental arch veneer, and/or one or more components or portions thereof, as a single body and/or in a single manufacturing step.

The forming at 430 may include forming the dental arch veneer by any suitable manufacturing process. In some examples, the forming at 430 includes 3D printing the dental arch veneer, and/or one or more components or portions thereof. Additionally or alternatively, the forming may include molding the dental arch veneer, and/or portions thereof. As another example, the forming at 430 may include machining the dental arch veneer, and/or portions thereof. When the forming at 430 includes forming one or more portions of the dental arch veneer separately, the forming further may include operatively coupling the one or more portions to one another by any suitable mechanism. As examples, the forming at 430 may include operatively coupling the one or more portions by one or more adhesives, one or more mechanical coupling mechanisms, and/or by one or more welds.

The forming at 430 also may include forming the dental arch veneer from any suitable combination of one or more materials. As examples, the forming at 430 may include forming the dental arch veneer from a single material or from a set of one or more materials. Alternatively, the forming at 430 may include forming one or more portions of the dental arch veneer from different materials. As discussed herein, examples of suitable materials for forming the dental arch veneer, and/or portions thereof, include one or more resins, one or more ceramics, one or more metals, and/or one or more polymeric materials.

The forming at 430 may be performed by any suitable party. In some examples, the forming at 430 is performed by a dental practitioner, such as a dentist, an orthodontist, a surgeon, and/or a technician. For examples in which the forming at 430 is performed by a dental practitioner, the forming at 430 may include 3D printing the dental arch veneer on-site by the dental practitioner. Additionally or alternatively, the forming at 430 may be performed by a different party from the one or more parties that perform the determining at 405, the obtaining at 410, the manipulating at 420, and/or the determining at 425. As an example, a dental practitioner, such as a dentist, an orthodontist, a surgeon, and/or a technician, may obtain the representation at 410, manipulate the representation at 420, and determine the anchoring positions of the bone mount at 425. Subsequently, the dental practitioner may send the manipulated representation from step 420 and the plurality of anchoring positions from step 425 to a manufacturer, and the manufacturer may perform the forming at 430 based on the anchoring positions and the manipulated representation received from the practitioner. In such examples, methods 400 additionally or alternatively may be described as including receiving the dental arch veneer in place of the forming the dental arch veneer, at least when described from the practitioner's perspective.

With continued reference to FIG. 14, in some examples, methods 400 include installing the bone mount at 435. The installing at 435 may include installing the plurality of bone screws of the bone mount in the plurality of anchoring positions determined at step 425. With this in mind, in some examples the installing at 435 includes marking the anchoring positions determined at step 425 within the user's mouth. As discussed herein, in some examples, the bone mount includes a rail that extends between two or more of the bone screws. In such examples, the installing at 435 additionally includes interconnecting the rail to the two or more bone screws.

The installing at 435 may be performed with any suitable sequence or timing within methods 400. As examples, the installing at 435 may be performed subsequent to the determining at 425, subsequent to the forming at 430, and/or prior to the installing at 440. Additionally or alternatively the installing at 435 may be performed substantially simultaneously with, and/or prior to the forming at 430.

The installing at 435 may be performed by any suitable party. As an example, the installing at 435 may be performed by a dental practitioner, such as a dentist, an orthodontist, a surgeon, and/or a technician. The installing at 435 may be performed according to conventional and/or otherwise suitable oral surgical procedures. For example, the installing at 435 may include preparing the user's mouth for anchoring the plurality of bone screws, such as by administering a local anesthetic, administering an anti-inflammatory agent, and/or administering an antiseptic agent proximate the anchoring positons of the plurality of bone screws.

As shown in FIG. 14, in some examples, methods 400 include temporarily installing the dental arch veneer at 440. As discussed in more detail herein, the installing at 440 may include temporarily installing the dental arch veneer in the user's mouth by interconnecting the coupling structure of the dental arch veneer with the bone mount. As a more specific example, as discussed in more detail herein, the coupling structure may include a plurality of couplers that are configured to be selectively and repeatedly coupled to and uncoupled from the bone mount. In such examples, the installing at 440 may include selectively interconnecting each coupler with a predetermined portion of the bone mount, such as a preselected bone screw.

The installing at 440 may be performed with any suitable sequence or timing within methods 400. As an example, the installing at 440 may be performed subsequent to any other step of methods 400. The installing at 440 also may be performed by any suitable party. In some examples, the installing at 440 may be, at least initially, performed by a dental practitioner, such as a dentist, an orthodontist, a surgeon, and/or a technician, and then subsequently be performed by the user. For example, the installing at 440 may be performed, at least initially, by the practitioner to ensure that any one or more preceding steps of methods 440 were performed correctly, such that the dental arch veneer adequately obscures the target region of the user's mouth and presents the desired oral appearance in a vestibular direction of the target region. When the forming at 440 is performed by a manufacturer, the manufacturer may send the dental arch veneer directly to the user, and the user may perform the installing at 440 independently of the practitioner.

The installing at 440 may be performed any suitable number of times within methods 440. For example, the installing at 440 may be performed any suitable times by the user, such as when the user desires to selectively remove and reinstall the dental arch veneer. As another example, the installing at 440 may be performed by the practitioner initially, and subsequently selectively removing and reinstalling the dental arch veneer any suitable number of times by the user.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities may optionally be present other than the entities specifically identified by the "and/of" clause, whether related or unrelated to those entities specifically identified. Thus, as a non-limiting example, a reference to "A and/or B," when used in conjunction with open-ended language such as "comprising," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities, should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "At least one of A or B," or, equivalently, "at least one of A and/or B") may refer, in one embodiment to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure that was present originally.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase "for example," the phrase "as an example," and/or simply the term "example," when used with reference to one or more components, features, details, structures, embodiments, and/or methods according to the present disclosure, are intended to convey that the described component, feature, detail, structure, embodiment, and/or method is an example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Examples of dental arch veneers, and related methods according to the present disclosure are presented in the following enumerated paragraphs. It is within the scope of the present disclosure that an individual step of a method recited herein, including the following enumerated paragraphs, additionally or alternatively may be referred to as a "step for" preforming the recited action.

A1. A bone-secured dental arch veneer that is configured to be temporarily installed in a user's mouth to provide a desired oral appearance to the user's mouth, the dental arch veneer comprising:
 a veneer assembly that includes one or more tooth veneers and a support structure that is operatively coupled to the one or more tooth veneers and configured to support the one or more tooth veneers; and
 a coupling structure that is configured to interconnect the veneer assembly to a bone mount that is installed in a mandible or a maxilla of the user's mouth, wherein the coupling structure further is configured to support the veneer assembly spaced-apart from a corresponding dental arch of the user's mouth to permit the veneer assembly to be selectively and repeatedly interconnected with, and disconnected from, the bone mount without damaging the dental arch veneer, and wherein the bone mount comprises one or more bone screws that are anchored in one or more bone surfaces of the maxilla or the mandible of the user's mouth.

A2. The dental arch veneer of paragraph A1, wherein the veneer assembly is configured to obscure a target region of the user's mouth and to present the desired oral appearance in a vestibular direction of the target region.

A3. The dental arch veneer of paragraph A2, wherein the target region includes one or more damaged teeth that are included in the corresponding dental arch of the user's mouth, and wherein the coupling structure is configured to support the veneer assembly spaced-apart in a vestibular direction from the one or more damaged teeth.

A4. The dental arch veneer of any of paragraphs A2-A3, wherein the target region includes one or more misaligned teeth that are included in the corresponding dental arch of the user's mouth, and wherein the coupling structure is configured to support the veneer assembly spaced-apart in a vestibular direction from the one or more misaligned teeth.

A5. The dental arch veneer of any of paragraphs A2-A4, wherein the target region includes one or more gaps corresponding to one or more missing teeth.

A6. The dental arch veneer of paragraph A2, wherein the target region includes one or more gaps corresponding to one or more missing teeth, and wherein the dental veneer at least partially extends within the target region.

A7. The dental arch veneer of any of paragraphs A2-A6, wherein the target region includes a surgical site that is included in the corresponding dental arch of the user's mouth.

A8. The dental arch veneer of paragraph A7, wherein the surgical site includes one or more of one or more pre-implants, a surgical wound, a pre-surgery site, and an active surgery site, and wherein the coupling structure is configured to support the veneer assembly spaced-apart in a vestibular direction from the surgical site.

A9. The dental arch veneer of any of paragraphs A2-A8, wherein when orthodontic hardware is installed in the user's mouth and at least a portion of the orthodontic hardware is positioned within the target region, the coupling structure is configured to support the veneer assembly spaced-apart in a vestibular direction from the portion of the orthodontic hardware that is positioned within the target region.

A10. The dental arch veneer of paragraph A9, wherein the orthodontic hardware that is positioned within the target region is installed on vestibular surfaces of one or more teeth that are within the target region, and wherein the coupling structure supports the veneer assembly such that the orthodontic hardware that is positioned within the target region extends between the veneer assembly and the one or more teeth that are within the target region.

A11. The dental arch veneer of any of paragraphs A9-A10, wherein the veneer assembly is configured to be non-contacting with the orthodontic hardware.

A12. The dental arch veneer of any of paragraphs A1-A11, wherein the support structure is integral with the one or more tooth veneers.

A13. The dental arch veneer of any of paragraphs A1-A12, wherein the support structure is fixedly coupled to the one or more tooth veneers.

A14. The dental arch veneer of any of paragraphs A1-A13, wherein the one or more tooth veneers extend from the support structure.

A15. The dental arch veneer of any of paragraphs A1-A14, wherein the support structure includes a support bar that is configured to reinforce the dental arch veneer.

A16. The dental arch veneer of paragraph A15, wherein the support bar is configured to interconnect with the coupling structure.

A17. The dental arch veneer of any of paragraphs A1-A16, wherein the support structure is configured to form a loop that extends around lingual, posterior, and vestibular regions of the corresponding dental arch of the user's mouth.

A18. The dental arch veneer of paragraph A17, wherein the loop of the support bar includes a lingual portion that extends around the lingual region of the corresponding dental arch of the user's mouth, wherein one or more lingual couplers of the coupling structure extend from the lingual portion of the loop, and wherein the one or more lingual couplers are configured to be selectively and repeatedly coupled to and decoupled from a portion of the bone mount that is anchored in a lingual portion of the maxilla or mandible of the user's mouth.

A19. The dental arch veneer of any of paragraphs A17-A18, wherein a support bar of the support structure forms at least a portion of the loop.

A20. The dental arch veneer of any of paragraphs A1-A19, wherein the support structure is configured to support the one or more tooth veneers in a desired arrangement.

A21. The dental arch veneer of any of paragraphs A1-A20, wherein the veneer assembly is configured to obscure a/the target region of the user's mouth and to present the desired oral appearance in a vestibular direction of the target region, and wherein the desired arrangement of the one or more tooth veneers is based on the desired oral appearance of the corresponding dental arch within the target region.

A22. The dental arch veneer of paragraph A21, wherein the veneer assembly comprises a plurality of tooth veneers, and wherein a/the desired arrangement includes the plurality of tooth veneers being arranged in an arcuate shape that corresponds to a shape of the corresponding dental arch within the target region.

A23. The dental arch veneer of any of paragraphs A1-A22, wherein the dental arch veneer is configured to be temporarily installed in the user's mouth while one or more teeth within a/the target region of the user's mouth are undergoing orthodontic rearrangement.

A24. The dental arch veneer of paragraph A23, wherein the dental arch veneer further is configured to be non-interacting with the orthodontic rearrangement of the one or more teeth.

A25. The dental arch veneer of any of paragraphs A1-A24, wherein the support structure includes an adjustment mechanism that is configured to permit adjustment of an arch-span of the dental arch veneer, and wherein the adjustment includes one or more of an extension of the arch-span of the dental arch veneer and a contraction of the arch-span of the dental arch veneer.

A26. The dental arch veneer of paragraph A25, wherein the adjustment mechanism is configured to permit incremental adjustment of the arch-span of the dental arch veneer.

A27. The dental arch veneer of any of paragraphs A25-A26, wherein the adjustment mechanism is configured to permit a coupling structure to interconnect the veneer assembly with the bone mount during an orthodontic treatment of a region of the user's mouth, in which the orthodontic treatment causes one or more positions of the bone mount to shift.

A28. The dental arch veneer of any of paragraphs A25-A27, wherein the veneer assembly is configured to obscure a/the target region of the user's mouth and present the desired oral appearance in a/the vestibular direction of the target region, wherein the adjustment mechanism is configured to permit the dental arch veneer to be temporarily installed in the user's mouth and the veneer assembly to obscure the target region during orthodontic rearrangement of one or more teeth included in the target region, and wherein the one or more teeth are caused to shift in position during the orthodontic rearrangement.

A29. The dental arch veneer of any of paragraphs A25-A28, wherein extension of the arch-span of the dental arch veneer is configured to permit the dental arch veneer to be temporarily installed across a region of the user's mouth that is undergoing an expansion orthodontic procedure, and wherein the region includes a/the target region.

A30. The dental arch veneer of any of paragraphs A25-A29, wherein contraction of the arch-span of the dental arch veneer is configured to permit the dental arch veneer to be temporarily installed in a region of the user's mouth that is undergoing a contraction orthodontic procedure, and wherein the region includes a/the target region.

A31. The dental arch veneer of any of paragraphs A1-A30, wherein the coupling structure is configured to be selectively and repeatedly coupled to and uncoupled from the one or more bone screws of the bone mount without damage to the bone mount or the coupling structure.

A32. The dental arch veneer of any of paragraphs A1-A31, wherein the bone mount comprises one or more lingual bone screws that are anchored in a lingual bone surface or a palatal bone surface of the maxilla or the mandible of the user's mouth.

A33. The dental arch veneer of any of paragraphs A1-A32, wherein the bone mount comprises one or more buccal bone screws that are anchored in one or more buccal bone surfaces of the maxilla or mandible of the user's mouth.

A34. The dental arch veneer of any of paragraphs A1-A33, wherein the bone mount comprises one or more palatal bone screws that are anchored in a palatal bone surface of the maxilla.

A35. The dental arch veneer of any of paragraphs A1-A34, wherein the bone mount comprises one or more lingual bone screws that are anchored in a lingual surface of the mandible.

A36. The dental arch veneer of any of paragraphs A1-A35, wherein the coupling structure is configured to interconnect with a rail of the bone mount, wherein the bone mount includes a plurality of bone screws, and wherein the rail extends between two or more of the bone screws.

A37. The dental arch veneer of paragraph A36, wherein the rail includes a non-circular cross-section.

A38. The dental arch veneer of any of paragraphs A1-A37, wherein the coupling structure is configured to permit the dental arch veneer to be selectively and repeatedly installed in and removed from the user's mouth without damaging the dental arch veneer.

A39. The dental arch veneer of any of paragraphs A1-A38, wherein the coupling structure is configured to be selectively and repeatedly coupled to and decoupled from the veneer assembly without damaging the dental arch veneer.

A40. The dental arch veneer of paragraph A39, wherein the coupling structure extends from the bone mount.

A41. The dental arch veneer of any of paragraphs A39-A40, wherein the coupling structure includes one or more couplers that are configured to be selectively and repeatedly coupled to and uncoupled from the veneer assembly.

A42. The dental arch veneer of paragraph 41, wherein at least one coupler of the one or more couplers is configured to be selectively and repeatedly coupled to and uncoupled from the veneer assembly through a coupling mechanism, wherein the coupling mechanism includes one or more of a friction-fit coupling mechanism, an adhesive coupling mechanism, a screw-fit coupling mechanism, a magnetic coupling mechanism, an adhesive coupling mechanism, a snap-fit coupling mechanism, and a press-fit coupling mechanism.

A43. The dental arch veneer of any of paragraphs A1-A39, wherein the coupling structure comprises one or more couplers that are configured to be selectively and repeatedly coupled to and uncoupled from the bone mount.

A44. The dental arch veneer of any of paragraphs A1-A43, wherein at least one coupler of the one or more couplers is configured to be selectively and repeatedly coupled to and uncoupled from a corresponding bone screw of the one or more bone screws.

A45. The dental arch veneer of paragraph A44, wherein the at least one coupler of the one or more couplers is configured to be selectively and repeatedly coupled to and uncoupled from the corresponding bone screw of the one or more bone screws through a coupling mechanism, wherein the coupling mechanism includes one or more of a friction fit coupling mechanism, an adhesive coupling mechanism, a screw fit coupling mechanism, a magnetic coupling mechanism, an adhesive coupling mechanism, a snap-fit coupling mechanism, and a press fit coupling mechanism.

A46. The dental arch veneer of any of paragraphs A42-A43, wherein at least one coupler of the one or more couplers is configured to be selectively and repeatedly coupled to and uncoupled from a/the rail of the bone mount.

A47. The dental arch veneer of any of paragraphs A42-A46, wherein the coupling structure extends from the veneer assembly.

A48. The dental arch veneer of any of paragraphs A42-A47, wherein the coupling structure is integral with the veneer assembly.

A49. The dental arch veneer of any of paragraphs A42-A48, wherein the coupling structure extends from the support structure.

A50. The dental arch veneer of any of paragraphs A1-A49, wherein the coupling structure comprises one or more bridging sections that extend between the veneer assembly and a/the one or more couplers.

A51. The dental arch veneer of any of paragraphs A1-A50, wherein the dental arch veneer further comprises an artificial gum structure that is configured to provide a desired gum appearance to the user's mouth in a vestibular direction of a/the target region.

A52. The dental arch veneer of paragraph A51, wherein the artificial gum structure includes the support structure.

A53. The dental arch veneer of paragraphs A51-A52, wherein the artificial gum structure at least partially covers a vestibular surface of the support structure.

A54. The dental arch veneer of any of paragraphs A51-A53, wherein the artificial gum structure defines at least a portion of the coupling structure.

A55. The dental arch veneer of any of paragraphs A51-A53, wherein the artificial gum structure at least partially covers a vestibular surface of the coupling structure.

A56. The dental arch veneer of any of paragraphs A1-A55, wherein the dental arch veneer is a maxillary dental arch veneer, wherein the bone mount is installed in the maxilla, wherein the coupling structure is configured to support the veneer assembly spaced-apart from a maxillary dental arch of the user's mouth, and wherein the one or more bone screws of the bone mount are anchored in one or more bone surfaces of the maxilla of the user's mouth.

B1. A bone-secured maxillary dental arch veneer that is configured to be temporarily installed in a user's mouth to provide a desired oral appearance to the user's mouth, the dental arch veneer comprising:

a veneer assembly comprising a plurality of tooth veneers and a support structure that is operatively coupled to the plurality of tooth veneers, wherein the support structure is configured to support the plurality of tooth veneers; and a coupling structure that is configured to interconnect the veneer assembly to a bone mount that is anchored in a maxilla of the user's mouth, wherein the coupling structure further is configured to support the veneer assembly spaced-apart in a vestibular direction of a maxillary dental arch of the user's mouth and permit the veneer assembly to be selectively and repeatedly interconnected with and disconnected from the bone mount without damaging the dental arch veneer, and wherein the bone mount comprises one or more bone screws that are anchored in one or more of a buccal bone surface and a labial bone surface of the maxilla.

C1. A method of fabricating a bone-mounted dental arch veneer that is configured to be temporarily installed in a user's mouth to provide a desired oral appearance to the user's mouth, the method comprising:

determining a target region within the user's mouth, wherein the target region is to be obscured by a veneer assembly of the dental arch veneer;

obtaining a representation of at least one of the user's teeth and the user's gum within the target region;

manipulating the representation to create a desired arrangement of the user's teeth and gum within the target region;

determining a plurality of anchoring positions within a bone structure proximate the target region for anchoring a plurality of bone screws of a bone mount; and forming the dental arch veneer based on the anchoring positions and the desired arrangement, wherein the dental arch veneer comprises:

a veneer assembly comprising a plurality of tooth veneers and a support structure that is operatively coupled to the plurality of tooth veneers, wherein the support structure is configured to support the tooth veneers; and a coupling structure that is configured to interconnect the veneer assembly to the bone mount, wherein the coupling structure further is configured to support the veneer assembly spaced-apart in a vestibular direction from a dental arch of the user's mouth that corresponds to the target region and to permit the veneer assembly to be selectively and repeatedly interconnected with and disconnected from the bone mount without damaging the dental arch veneer.

C2. The method of paragraph C1, further comprising obtaining a representation of the bone structure that is proximate the target region, wherein the determining the plurality of anchoring positions within the bone structure is based on the representation of the bone structure that surrounds the target region.

C3. The method of any of paragraphs C1-C2, further comprising installing the plurality of bone screws of the bone mount in the plurality of anchoring positions.

C4. The method of any of paragraphs C1-C3, further comprising temporarily installing the dental arch veneer in the user's mouth by interconnecting the coupling structure to the bone mount.

C5. The method of any of paragraphs C1-C4, wherein the coupling structure comprises a plurality of couplers that are configured to be selectively and repeatedly coupled to and uncoupled from the bone mount, and wherein the forming the dental arch veneer comprises forming the plurality of couplers.

C6. The method of paragraph C5, when depending from paragraph C4, wherein each coupler of the plurality of couplers is configured to be selectively and repeatedly coupled to and uncoupled from a corresponding bone screw of the plurality of bone screws of the bone mount, and wherein the temporarily installing comprises interconnecting each coupler of the plurality of couplers with the corresponding bone screw.

C7. The method of any of paragraphs C1-C6, wherein the forming the dental arch veneer comprises 3D printing one or more portions of the dental arch veneer.

C8. The method of any of paragraphs C1-C7, wherein the dental arch veneer is the dental arch veneer of any of paragraphs A1-A56 or B1.

The invention claimed is:

1. A bone-secured dental arch veneer that is configured to provide a desired oral appearance to a user's mouth and to be temporarily installed in the user's mouth, the dental arch veneer comprising:

a bone mount that includes a plurality of bone screws configured to be anchored in one or more of a buccal bone surface and a labial bone surface of a mandible or a maxilla of the user's mouth;

a veneer assembly configured to be temporarily installed in the user's mouth by connection to the bone mount; and a coupling structure that is configured to interconnect the veneer assembly to the bone mount; wherein the coupling structure is configured to extend gingivally of the veneer assembly and within a vestibule of the user's mouth to interconnect the veneer assembly with the bone mount; wherein the coupling structure and the bone mount further are configured to support the veneer assembly spaced-apart from a corresponding dental arch of the user's mouth to permit the veneer assembly to be selectively and repeatedly interconnected with and disconnected from the bone mount without damaging the dental arch veneer;

wherein the veneer assembly comprises:

a plurality of tooth veneers;

a support structure that is operatively coupled to the plurality of tooth veneers and configured to support the plurality of tooth veneers within the user's mouth; wherein the support structure includes a plurality of adjustable support structure portions from which the coupling structure extends to interconnect the veneer assembly to the plurality of bone screws; and further wherein one or more of the plurality of tooth veneers extends from each of the adjustable support structure portions;

a central veneer portion from which a subset of the plurality of tooth veneers extends; and an adjustment mechanism that forms a portion of the support structure and which is configured to adjustably couple the central veneer portion to the plurality of adjustable support structure portions to permit selective adjustment of an arch-span of the dental arch veneer; wherein the adjustment includes expansion or contraction of the arch-span of the dental arch veneer; and responsive to the adjustment, the subset of the plurality of tooth veneers that extends from the central veneer portion are shifted relative to the one or more tooth veneers that extend from the adjustable support structure portions.

2. The dental arch veneer of claim 1, wherein the coupling structure includes a plurality of couplers that extend from each of the adjustable support structure portions; wherein each of the plurality of couplers that extend from each of the adjustable support structure portions are configured to be coupled to a respective bone screw of the plurality of bone screws.

3. The dental arch veneer of claim 2, wherein responsive to the adjustment, the plurality of couplers that extend from one of the plurality of adjustable support structure portions is shifted relative to the plurality of couplers that extend from another of the plurality of adjustable support structure portions.

4. The dental arch veneer of claim 2, wherein each of the plurality of couplers is configured to be selectively and repeatedly coupled to and uncoupled from the bone mount without damage to the bone mount or the coupling structure.

5. The dental arch veneer of claim 1, wherein the adjustment mechanism is at least one of a sliding adjustment mechanism and a telescoping adjustment mechanism that is configured to permit selective sliding and/or telescoping of the central veneer portion relative to the plurality of adjustable support structure portions.

6. The dental arch veneer of claim 5, wherein the central veneer portion includes a plurality of receivers; and further wherein each adjustable support structure portion includes a rod that extends from the adjustable support structure portion, is received within a respective receiver of the plurality of receivers, and is configured to selectively and operatively translate within the respective receiver as the arch-span of the dental arch veneer is adjusted.

7. The dental arch veneer of claim 6, wherein each rod includes a terminal end that limits a range of translation of the rod relative to the respective receiver of the plurality of receivers.

8. The dental arch veneer of claim 6, wherein the rods are configured to be selectively secured at a relative position relative to the plurality of receivers.

9. The dental arch veneer of claim 1, wherein the adjustment mechanism is configured to permit incremental adjustment of the arch-span.

10. The dental arch veneer of claim 1, wherein responsive to the adjustment being a contraction of the arch-span of the dental arch veneer, the subset of the plurality of tooth veneers overlaps with the one or more tooth veneers that extends from at least one of the adjustable support structure portions by a greater extent than immediately prior to the adjustment.

11. The dental arch veneer of claim 1, wherein responsive to the adjustment being an expansion of the arch-span of the dental arch veneer, the subset of the plurality of tooth veneers overlaps with the one or more tooth veneers that extends from at least one of the adjustable support structure portions by a lesser extent than immediately prior to the adjustment.

12. The dental arch veneer of claim 1, wherein the dental arch veneer includes opposed posterior ends; and wherein the arch-span is measured as a distance extending along the dental arch veneer between the posterior ends of the dental arch veneer.

13. The dental arch veneer of claim 1, wherein the coupling structure is configured to support the dental arch veneer spaced-apart from a corresponding dental arch of the user's mouth in a vestibular direction without any portion of the dental arch veneer extending across a lingual surface of the corresponding dental arch of the user's mouth.

14. The dental arch veneer of claim 1, wherein the dental arch veneer is configured to be temporarily installed in the user's mouth without directly contacting the corresponding dental arch.

15. The dental arch veneer of claim 1, wherein the coupling structure is configured to interconnect the veneer assembly to the bone mount in a manner that does not facilitate or contribute to orthodontic rearrangement of teeth within the user's mouth.

16. The dental arch veneer of claim 1, wherein the veneer assembly is configured to obscure a target region of the user's mouth and present the desired oral appearance in a vestibular direction of the target region; and further wherein the adjustment mechanism permits the arch-span of the dental arch veneer to be adjusted to adjust to obscure different sizes of target regions.

17. The dental arch veneer of claim 16, wherein the support structure is configured to support the plurality of tooth veneers in a desired arrangement; and wherein the desired arrangement includes the plurality of tooth veneers being arranged in an arcuate shape that corresponds to a shape of the corresponding dental arch within the target region.

18. The dental arch veneer of claim 16, wherein the dental arch veneer is configured to be temporarily installed in the user's mouth while one or more of the user's teeth within the target region are undergoing orthodontic rearrangement, and wherein the dental arch veneer further is configured to be non-interacting with the orthodontic rearrangement of the one or more teeth.

19. The dental arch veneer of claim 16, wherein the target region includes one or more misaligned teeth and/or one or more gaps that are included in the corresponding dental arch of the user's mouth, and wherein the coupling structure is configured to support the veneer assembly spaced-apart in the vestibular direction from the one or more misaligned teeth and/or the one or more gaps.

20. The dental arch veneer of claim 1, wherein the coupling structure is configured to interconnect with a rail of the bone mount; and wherein the rail extends between two or more bone screws of the plurality of bone screws.

* * * * *